US011775905B1

(12) United States Patent
Pitzer

(10) Patent No.: US 11,775,905 B1
(45) Date of Patent: Oct. 3, 2023

(54) SYSTEMS AND METHODS FOR TEXT-TO-SPEECH AUDIO PROCESSING AND AUDIO TRANSDUCTION

(71) Applicant: Cornelius Jacobus Pitzer, Vancouver (CA)

(72) Inventor: Cornelius Jacobus Pitzer, Vancouver (CA)

( * ) Notice: Subject to any disclaimer, the term of this patent is extended or adjusted under 35 U.S.C. 154(b) by 0 days.

(21) Appl. No.: 18/154,105

(22) Filed: Jan. 13, 2023

(51) Int. Cl.
*G06Q 10/0635* (2023.01)
*G06F 3/04842* (2022.01)
*G10L 13/04* (2013.01)
*G06F 3/0481* (2022.01)

(52) U.S. Cl.
CPC ....... *G06Q 10/0635* (2013.01); *G06F 3/0481* (2013.01); *G06F 3/04842* (2013.01); *G10L 13/04* (2013.01)

(58) Field of Classification Search
CPC ........... G06Q 10/00–50/00; G06F 1/00–40/00; G10L 13/00–25/00
USPC ............................................... 705/7.11–7.42
See application file for complete search history.

(56) References Cited

U.S. PATENT DOCUMENTS

| | | | | |
|---|---|---|---|---|
| 11,392,970 B2* | 7/2022 | BaderEddin | ............ | G10L 13/08 |
| 11,581,069 B2* | 2/2023 | Tommasi | ............... | G06N 20/00 |
| 2002/0038302 A1* | 3/2002 | Maeda | ..................... | G09B 7/00 |
| | | | | 705/52 |
| 2014/0229199 A1* | 8/2014 | Beckley | ................. | G16H 10/20 |
| | | | | 705/3 |
| 2014/0278783 A1* | 9/2014 | Du | ..................... | G06Q 30/0203 |
| | | | | 705/7.32 |
| 2017/0053299 A1* | 2/2017 | Rozga | ................ | G06Q 30/0203 |
| 2018/0232752 A1* | 8/2018 | BaderEddin | .......... | H04M 3/563 |
| 2019/0236509 A1* | 8/2019 | Ozasa | ..................... | G06F 16/22 |
| 2019/0385180 A1* | 12/2019 | Vogel | ..................... | G06Q 10/00 |
| 2020/0335183 A1* | 10/2020 | Tommasi | ............... | G06N 3/006 |

* cited by examiner

*Primary Examiner* — Alan S Miller
(74) *Attorney, Agent, or Firm* — Shumaker, Loop & Kendrick, LLP

(57) ABSTRACT

Systems and methods for text-to-speech audio processing and audio transduction include compiling a digital data collection program to be distributed to computing device(s), the compiling including receiving data collection information that includes textual data of query(s) to be included in the digital data collection program and implementing text-to-speech data processing of the textual data that generates audio data of the query(s). The compiled digital data collection program that includes the generated audio data is distributed to the computing device(s) for execution thereby facilitating displaying, via a user interface of a user device, the query(s) and facilitating providing, via the electroacoustic transducer, an audio output of the audio data corresponding to the displayed query(s). Response data input by a user of the user device and received in response to the query(s) is collected and aggregated with additional response data collected from other user(s) of the computing device(s).

20 Claims, 26 Drawing Sheets

800

Hello Bonjour Hallo Olá Hola Hallo

| English |
| Français |
| Deutsche |
| Português |
| Español |
| Nederlands |
| Afrikaans |

Welcome to the Safety Culture Survey

You have been asked to participate in this abbreviated survey which is designed to measure employees' perceptions about safety in your company.

This survey is totally confidential and anonymous and you will only be asked to give details of your employment level and the area that you oversee/work in.

No individual's responses can or will be reported. Please respond to the statements honestly. Note that this is a perception survey, so honest and accurate responses are the correct responses.

The survey will take about 5 minutes to complete (it is not the full survey, but a short version of it). Please ensure that you will not be disturbed during this period.

You will be given all the instructions you need to proceed on the next screens.

[ Next >> ]

FIG. 9

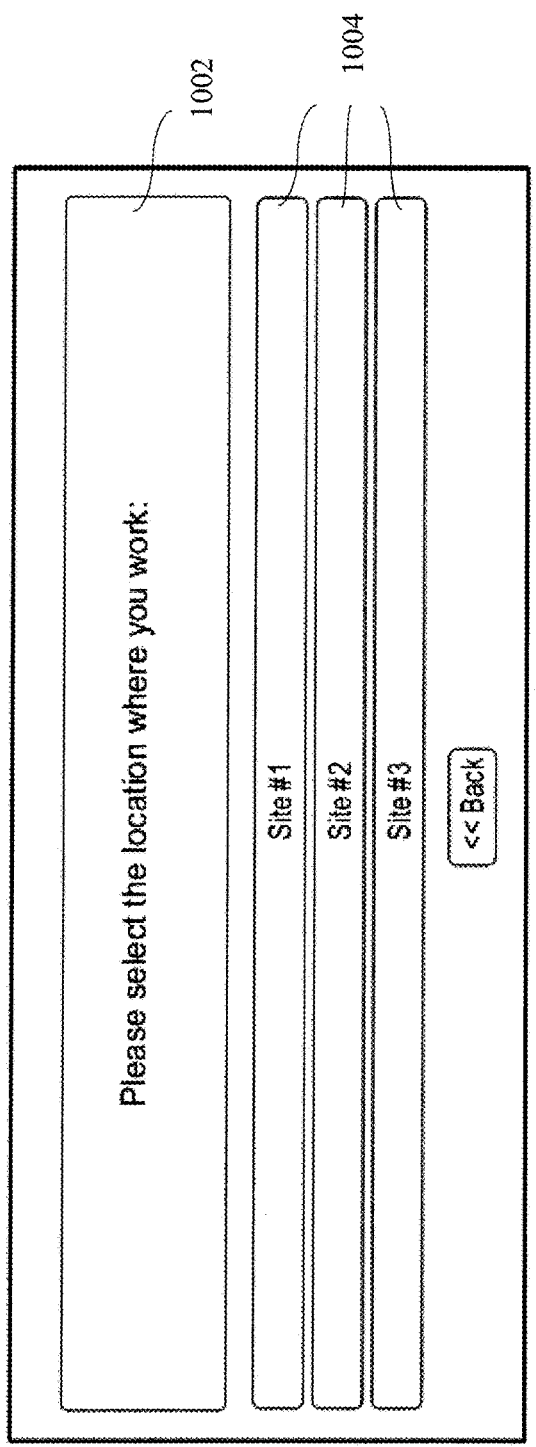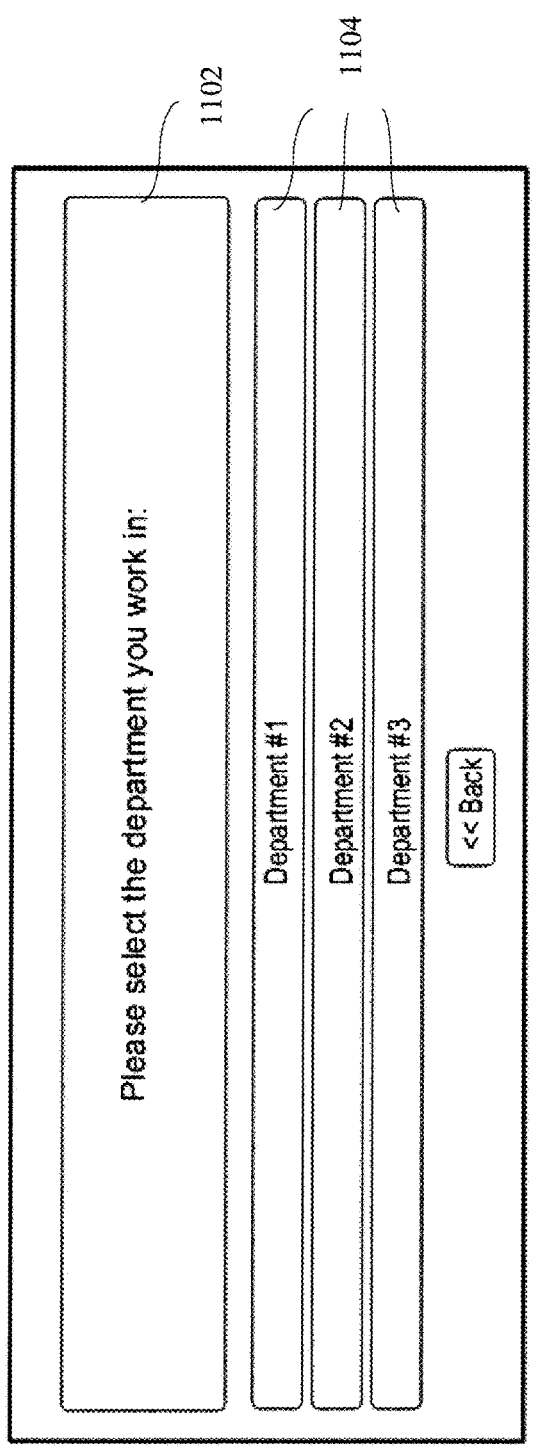

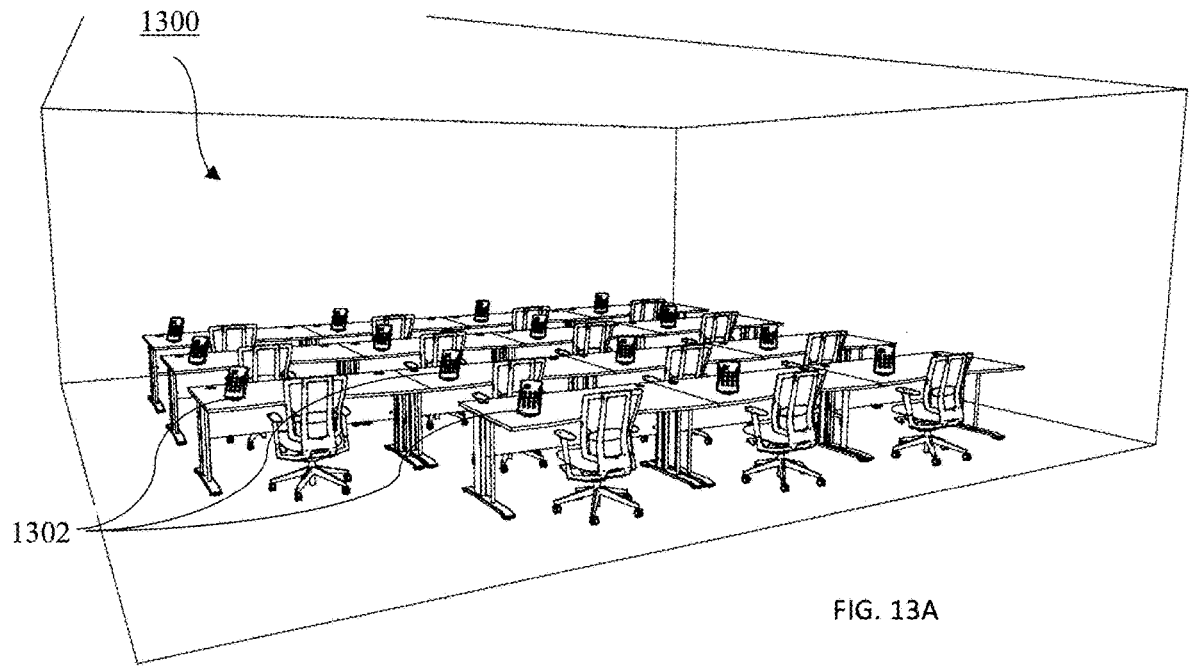
FIG. 13A
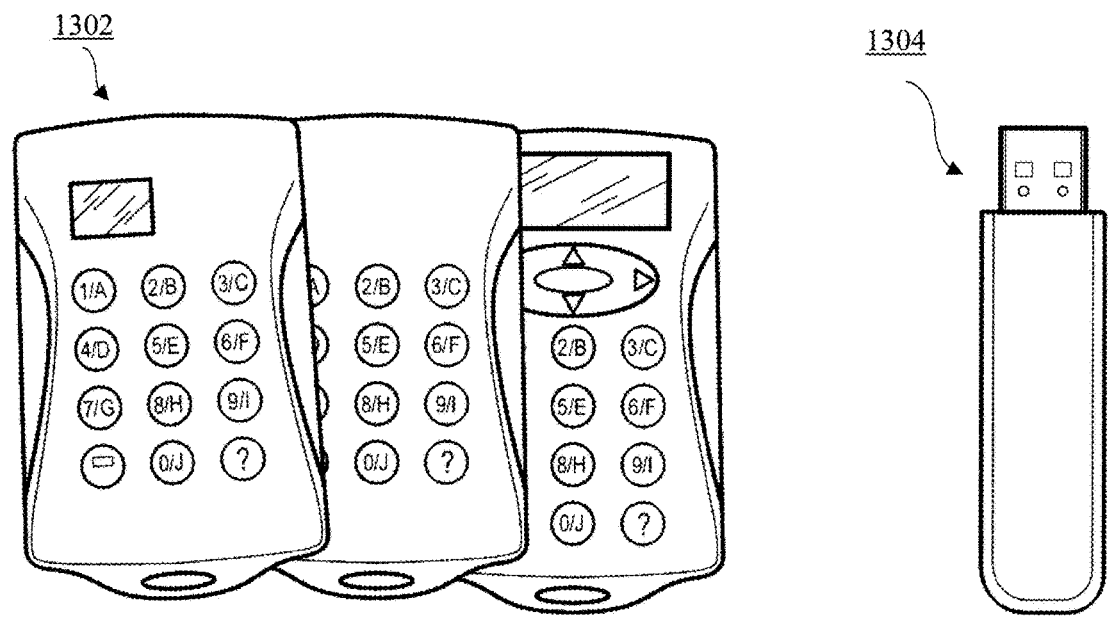
FIG. 13B
FIG. 13C

| PSI XYZ Company | Contractors | Operators | Supervisors | 13. Do conditions for Psychological Safety exist? Specialists | Managers | Snr Managers | Overall Difference From Benchmark |
|---|---|---|---|---|---|---|---|
| 1 Trusting Culture | -18.99 | -8.55 | 9.39 | 10.36 | 4.19 | -14.75 | -7.44 |
| 2 Caring Culture | -17.04 | -7.56 | 9.82 | -2.69 | -13.54 | -43.45 | -6.47 |
| 3 Informed Culture | -22.84 | -7.56 | -12.99 | -10.19 | -43.69 | -38.06 | -28.32 |
| 4 Just Culture | -22.40 | -5.96 | -25.77 | -0.30 | 0.27 | -58.40 | -3.67 |
| 5 Reporting Culture | -5.72 | -6.50 | -2.16 | -15.51 | -5.38 | -4.63 | -4.88 |
| 6 Flexible Culture | -8.99 | -20.68 | -8.53 | -23.82 | -27.16 | -31.91 | -28.42 |
| 7 Learning Culture | -33.02 | -25.44 | 13.24 | -1.52 | 6.02 | -26.74 | -20.06 |
| 13. Psychological safety | -18.50 | -22.60 | -2.96 | -6.44 | -6.72 | -30.52 | -23.91 |

FIG. 20

Tactical Findings and conclusions

- Perceptions of organizational commitment weakening at most, but acutely so at senior leadership level
- High levels of trust in management, at all job levels, with only slight weakening of direct supervisor trust emerging
- Response to and discipline to failure viewed as very constructive and supported by high levels of trust
- Unexpectedly, risk transparency severely reduced, evident at all leader groups, indicating apprehension
- Lack of risk attention and high levels of fatalism resulting in significant breakdowns on compliance
- Destructive team dynamics inducing strong influences and conditions for risk-taking, especially under work pressure
- Acute decline in recognition and team support for safe behaviors, aggravated by low sense of being valued
- Formal engagement practices viewed positively, but active involvement viewed extremely negatively
- Effective integration of risk controls into operations allows for task efficiencies
- Formal safety practices generally seen as constructive and of high quality.
- Personal and work stresses at high but contained levels, not affecting work outputs
- Management decisions well accepted, but weak overall alignment and sign of dissension at Executive level
- Conditions for Psychological safety are weakening, on Caring, Learning and Reporting indices, at leader groups

| 14. ALL FACTORS | (14) Are the overall results in line with the benchmarked industry? | | | |
|---|---|---|---|---|
| | Level | -6.5 | -9.4 | -11.1 | -6.6 |

FIG. 21

SYSTEMS AND METHODS FOR TEXT-TO-SPEECH AUDIO PROCESSING AND AUDIO TRANSDUCTION

FIELD OF THE INVENTION

This invention relates generally to the field of text-to-speech processing, and more particularly embodiments of the invention relate to systems and methods for text-to-speech audio processing and audio transduction.

BACKGROUND OF THE INVENTION

Many companies, universities, organizations, institutions, or other enterprises commonly generate digital surveys to employees, students, customers, or other target populations in order to obtain information, feedback, and/or opinions about various subjects. These digital surveys provide readily accessible data that can interpreted or evaluated. In some cases, these enterprises will retain commercial research companies that implement various survey methodologies to obtain the information. For instance, some enterprises may hire a commercial research company to provide analysis of various aspects of their enterprise, which may incorporate survey methodologies of employees or customers of the enterprise. Data obtained by incorporating the survey methodologies may then be analyzed, evaluated, and interpreted in order to determine whether certain enterprise objectives are being met.

The computing technology used to implement these digital surveys and analyze the data is constantly evolving, and there is an ever-growing need for enterprises to improve their data collection and analysis processes. Accordingly, the survey methodologies continually adapt in order to provide better outcomes to the enterprises. As part of that adaptation process, there is an ever-present need for survey methodologies to make improvements to the question format, the types of questions, the number of questions, or various other aspects of the survey methodologies in order to obtain more usable and accurate data that can provide the enterprise with an accurate analysis. Unfortunately, conventional digital survey systems still utilize survey methodologies that may be prone to response biases, agreement biases, results gaming, and/or reading errors.

Thus, a need exists for improved systems and methods for survey methodologies.

BRIEF SUMMARY

Shortcomings of the prior art are overcome and additional advantages are provided through the provision of a computing system for text-to-speech audio processing and audio distribution via an electroacoustic transducer. The computing system includes one or more processors and at least one computer readable storage medium that stores program instructions executable by the one or more processors. In particular, the program instructions are executable to, in part, compile a digital data collection program to be distributed to one or more computing devices. The compiling includes receiving data collection information, where the data collection information includes textual data of one or more queries to be included in the digital data collection program, and also includes implementing text-to-speech data processing of the textual data, where the text-to-speech data processing generates audio data of the one or more queries. The compiled digital data collection program that includes the generated audio data is distributed to the one or more computing devices for execution. This distributing facilitates displaying, via a user interface of a user device, the one or more queries and facilitates providing, via the electroacoustic transducer, an audio output of the audio data corresponding to the displayed one or more queries. Response data that is input by a user of the user device is collected, where the response data is received in response to the one or more queries. The collected response data is aggregated with additional response data that is collected from one or more other users of the one or more computing devices.

Additionally, disclosed herein is a computing system for text-to-speech audio processing and audio distribution via an electroacoustic transducer. The computing system includes one or more processors and at least one computer readable storage medium that stores program instructions executable by the one or more processors. In particular, the program instructions are executable to, in part, receive an electronic transmission at a user device comprising the electroacoustic transducer, where the electronic transmission includes a digital data collection program having associated audio data that is generated using text-to-speech audio processing. Further, the digital data collection program is executed, where the executing includes displaying, via a user interface of the user device, one or more queries. An audio output of the audio data is distributed via the electroacoustic transducer, where the audio output corresponds to the displayed one or more queries. Response data input by a user of the user device is collected, where the response data includes responses to the displayed one or more queries, and the collected response data is transmitted to an enterprise system device of an enterprise.

Also disclosed herein is a computer-implemented method for text-to-speech audio processing and audio distribution via an electroacoustic transducer. The computer-implemented method includes, in part, compiling a digital data collection program to be distributed to one or more computing devices. The compiling includes receiving data collection information, the data collection information comprising textual data of one or more queries to be included in the digital data collection program, and implementing text-to-speech data processing of the textual data, the text-to-speech data processing generating audio data of the one or more queries. The compiled digital data collection program that includes the generated audio data is distributed to the one or more computing devices for execution, the distributing facilitating displaying, via a user interface of a user device, the one or more queries and facilitating providing, via the electroacoustic transducer, an audio output of the audio data corresponding to the displayed one or more queries. Response data that is input by a user of the user device is collected, where the response data is received in response to the one or more queries. Further, the collected response data is aggregated with additional response data collected from one or more other users of the one or more computing devices.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

FIG. 8 depicts an example display screen of a component of a digital data collection program that is used to select a language of the digital data collection program, in accordance with an embodiment of the present invention;

FIG. 9 depicts an example display screen of a component of a digital data collection program that is used to describe parameters of the digital data collection program, in accordance with an embodiment of the present invention;

FIG. 10 depicts an example display screen of a component of a digital data collection program that includes a query related to site location, in accordance with an embodiment of the present invention;

FIG. 11 depicts an example display screen of a component of a digital data collection program that includes a query related to department of work, in accordance with an embodiment of the present invention;

FIG. 13A depicts an example environment for conducting a digital data collection program, in accordance with an embodiment of the present invention;

FIG. 13B depicts example devices used in the example environment of FIG. 13A for inputting response data in response to one or more queries included in a digital data collection program, in accordance with an embodiment of the present invention;

FIG. 13C depicts an example device capable of facilitating distributing a compiled digital data collection program within the example environment of FIG. 13A, in accordance with an embodiment of the present invention;

FIG. 15 depicts an example aggregation of collected response data from multiple respondents to the digital data collection program, in accordance with an embodiment of the present invention;

FIG. 18 depicts an example aggregation of collected response data from multiple respondents to the digital data collection program that work at an enterprise of a specified industry compared to response data from a top company in the specified industry, in accordance with an embodiment of the present invention;

FIG. 20 depicts an example analysis of alignment of responses between managerial levels of an enterprise within a specified industry compared to top companies within the specified industry, in accordance with an embodiment of the present invention;

FIG. 21 depicts an example analysis of findings and conclusions derived from responses received as part of the digital data collection program, in accordance with an embodiment of the present invention;

DETAILED DESCRIPTION

Figure 1:
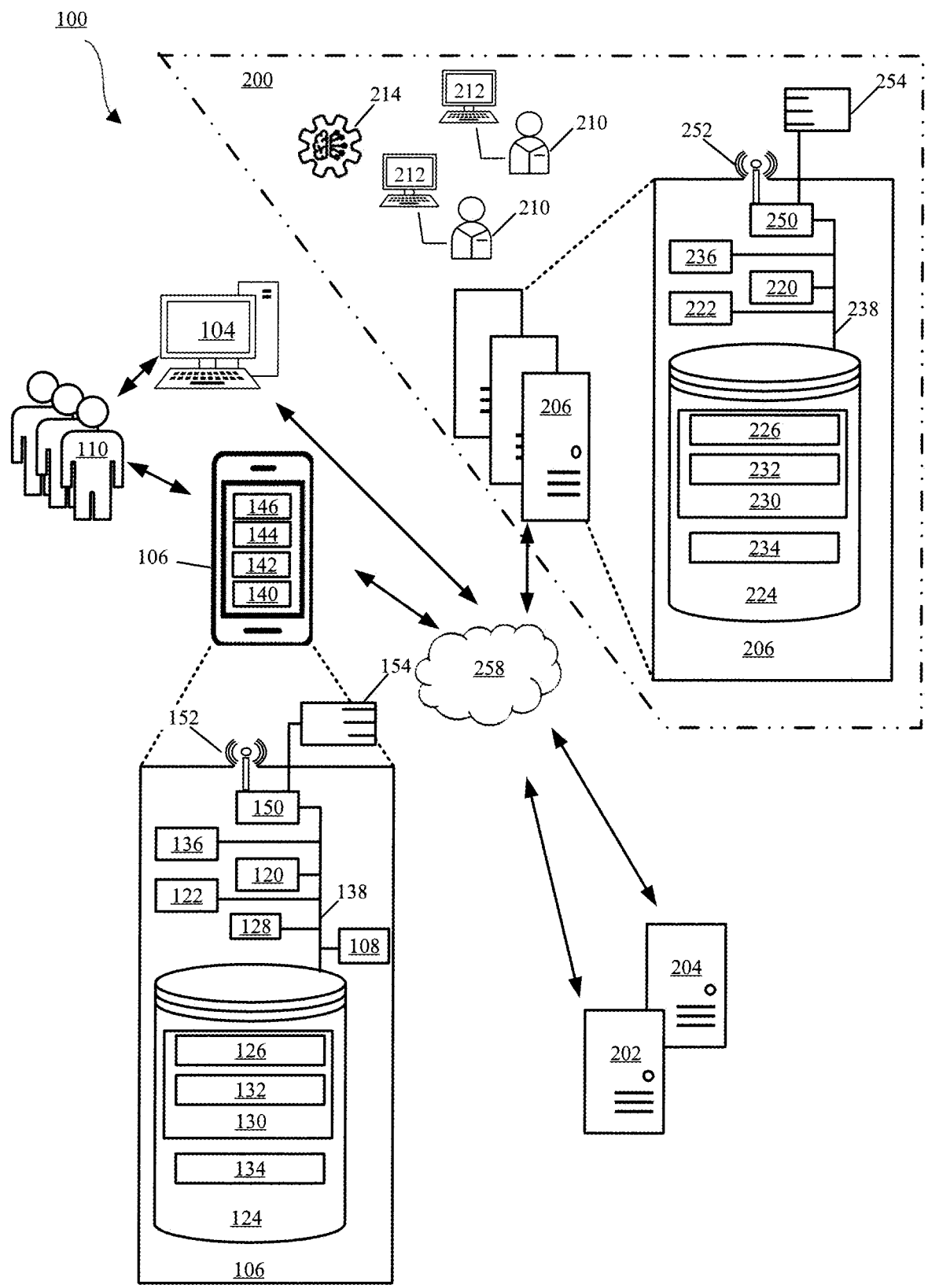
FIG. 1 illustrates an enterprise system, and environment thereof for text-to-speech audio processing and audio distribution via an electroacoustic transducer, in accordance with an embodiment of the present invention.

Aspects of the present invention and certain features, advantages, and details thereof are explained more fully below with reference to the non-limiting examples illustrated in the accompanying drawings. It is to be understood that the disclosed embodiments are merely illustrative of the present invention and the invention may take various forms. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

Descriptions of well-known processing techniques, systems, components, etc. are omitted to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

The specification may include references to "one embodiment", "an embodiment", "various embodiments", "one or more embodiments", etc. may indicate that the embodiment(s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Thus, unless described or implied as exclusive alternatives, features throughout the drawings and descriptions should be taken as cumulative, such that features expressly associated with some particular embodiments can be combined with other embodiments.

The terms "couple", "coupled", "couples", "coupling", and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. Additionally, "electrically coupled" and the like should be broadly understood and include coupling involving any electrical signal, whether a power signal, a data signal, and/or other types or combinations of electrical signals.

In addition, as used herein, the terms "about", "approximately", or "substantially" for any numerical values or ranges indicate a suitable dimensional tolerance that allows the device, part, or collection of components to function for its intended purpose as described herein.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

As used herein, the terms "enterprise" or "provider" generally describes a person or business enterprise that hosts, maintains, or uses the disclosed systems and methods. The term enterprise generally describes a person or business enterprise providing goods or services. Interactions between an enterprise and its employees or users, can be implemented as an interaction between a computing system of the enterprise and a user device of the employee or other user. Each interaction may produce response data via one or more inputs provided by the employee or other user. Such inputs may be converted and stored as response data files and aggregated with response data collected from other employees or users. Example inputs or responses may include, for example, answers to queries distributed as part of a digital data collection program (e.g., an employee survey).

As used herein, the terms "employee" or "user" may be used interchangeably and generally describe any person that interfaces with a computing device to which a digital data collection program is distributed, whether or not such user is "employed" and receives wages from the enterprise. In some instances, the "user" may not necessarily be an employee, but could be a business consultant, a business executive, a business owner, a shareholder, a job applicant, a customer, any person associated with the enterprise, or any other survey respondent.

Disclosed systems and methods provide text-to-speech audio processing and audio distribution via an electroacoustic transducer processes in part by incorporating artificial intelligence and text-to-speech (TTS) engines. Various embodiments described herein are in reference to utilizing the disclosed systems and methods in an employment environment where an enterprise distributes a digital data collection program (e.g., an employee survey) to various users via one or more computing devices. However, those of ordinary skill in the art will appreciate that the disclosed systems and methods are not limited to use in an employment environment or in the performance of an employee survey. The systems and methods described herein are generally applicable in other contexts where a user interacts with a computing system. Other example interactions may include an interaction with a customer or patron of an event, a potential voter in an election campaign, a visitor at a venue or other location, or the like.

FIG. 1 illustrates a computing system 100 and environment thereof, according to at least one embodiment. The computing environment generally includes a user 110 that benefits through use of services and products offered by a provider through an enterprise system 200. The computing environment may include, for example, a distributed cloud computing environment (private cloud, public cloud, community cloud, and/or hybrid cloud), an on-premise environment, fog-computing environment, and/or an edge-computing environment. The user 110 accesses services and products that incorporate the digital data collection program by use of one or more user devices 104, 106. Example user devices 104, 106 may include a laptop, desktop computer, a mobile computing device such as a smart phone, a portable digital assistant (PDA), a pager, a mobile television, a gaming device, a camera, a video recorder, an audio/video player, radio, a GPS device, a virtual assistant device such as a smart speaker or other smart home device, a wireless personal response device (e.g., student response systems or "clickers"), or any combination of the aforementioned, or other portable device with processing and communication capabilities. According to various embodiments, the one or more user devices may also include an electroacoustic transducer that the enterprise system 200 may utilize to communicate with the user 110. Such electroacoustic transducer may facilitate providing a human voice or human-like voice, real or synthesized, in whole or in part by any means through the use of facilities for the transmission of communications by the aid of wire, cable, wireless, or other connection between the point of origin and the point of reception where the point of reception includes any user device 104, 106.

In the illustrated example, the mobile device 106 is illustrated in FIG. 1 as having exemplary elements, the below descriptions of which apply as well to the computing device 104. The user device 104, 106 can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system used on personal computers, central computing systems, phones, and other devices.

The user 110 can be an individual, a group, or any entity in possession of or having access to the user device 104, 106, which may be personal, enterprise, or public items. Although the user 110 may be singly represented in some figures, in at least in some embodiments the user 110 is one of many such that a market or community of users, consumers, customers, business entities, government entities, clubs, and groups of any size.

The user device 104, 106, but as illustrated with reference to the mobile device 106, includes components such as, at least one of each of a processor 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processor 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user, or required or related to any or all of the applications or programs 130.

The memory device 122 is operatively coupled to the processor 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications that comprise computer-executable instructions and code executed by the processing device 120 to implement the functions of the user device 104, 106 described herein. For example, the memory device 122 may include such applications as a conventional web browser application and/or an enterprise-distributed application. These applications also typically provide a graphical user interface (GUI) on the display 140 that allows the user 110 to communicate via the user device 104, 106 with, for example, an enterprise system 200, and/or other devices or systems. In one embodiment, when the user 110 decides to participate in a digital data collection program, the user 110 may download or otherwise access an enterprise-based digital data collection program from an enterprise system 200 or from a distinct application server. In some embodiments, such as during a real-time, live digital data collection program, multiple user devices 140, 106 may communicate across a network with the enterprise system 200 and may transmit responses to the enterprise system 200 directly via one or more inputs. In other embodiments, the user 110 interacts with the enterprise system 200 via a web browser application in addition to, or instead of, an enterprise-distributed application.

The integrated software applications also typically provide a graphical user interface ("GUI") on the user computing device display screen 140 that allows the user 110 to utilize and interact with the user-computing device. The GUI display screens may include features for displaying information and accepting inputs from users, such as text boxes, data fields, hyperlinks, pull down menus, check boxes, radio buttons, and the like.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. In some embodiments, the mobile device 106 is or incorporates an audience response device or other personal response systems (e.g., a student response system).

The input and output system 136 includes an electroacoustic transducer 144 (e.g., a speaker) or other audio device. The electroacoustic transducer 144 may be configured to convert electrical signals to acoustic signals. For instance, the electroacoustic transducer 144 may utilize an analog electrical current flowing through a coil of wire to produce a varying magnetic force, which in turn causes vibration of the structure of the electroacoustic transducer 144 thereby causing molecules to be temporarily condensed (i.e., condensation) and then these molecules return to their original position (i.e., rarefaction). Oscillating rarefactions and condensations of the molecules generate a propagating sound wave that progresses outward from the electroacoustic transducer 144. In one particular example, the input and output system 136 employs a digital-to-analog converter (DAC) or sound card that converts a digital signal from the mobile device 106 into the analog electrical current that flows through the coil of wire in order for the electroacoustic transducer 144 to convert the electrical signal into an acoustic signal.

The input and output system 136 may also include other components enabling the computing device 104 or mobile device 106 to receive various inputs via, for example, button manipulations or screen touches from the user 110. Other non-limiting examples of input and output devices or components utilized by the input and output system 136 may include one or more of each, any, and all of a keypad, a wireless or wired keyboard, a touch-screen, a touchpad, a microphone 142, a mouse, a joystick, a pointer device, a button, a switch, a light, an LED, a soft key, an infrared sensor, personal response device (e.g., student response systems or "clickers"), a camera 146 (e.g., a digital camera), a buzzer, a bell, a printer and/or other input and output device(s). The input and output devices may be used by the user 110 to communicate with the computing device 104 or mobile device 106 to in whole or in part access, use, or control the computing device 104 or mobile device 106. For example, the user 110 can provide inputs via voice, text, or graphical indicia selections. In particular, the user 110 may provide various inputs to communicate the enterprise system 200, and in response, the enterprise system 200 may produce various outputs, thereby facilitating two-way communication between the user 110 and the enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106, may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138 (e.g., system bus), connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, short message service (SMS), enterprise messaging service (EMS), multimedia messaging service (MMS) messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, Global Positioning System (GPS) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The mobile device 106 further includes a power source 128, such as a battery, for powering various circuits and other devices that are used to operate the mobile device 106.

Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, a single system or server may provide the functions of one or more systems, servers, or illustrated components. In some embodiments, the functions of one illustrated system or server may be provided by multiple systems, servers, or computing devices, including those physically located at a central facility, those logically local, and those located as remote with respect to each other.

The enterprise system 200 can be accessed, used, or controlled, in whole or in part, by an enterprise (e.g., companies, universities, organizations, institutions, etc.) directly or tangentially associated with the user 110. For instance, as non-limiting examples, the enterprise may be an employer of the user 110, a venue (e.g., retail establishment, stadium, park, etc.) visited by the user 110, a school in which the user 110 is enrolled, a government agency, a commercial research company, a social media company, a company offering products or services, etc.

The enterprise system 200 may employ various automated or digital services or products accessible to the user 110 via the computing device 104 or mobile device 106. For instance, one such service or product accessible to the user 110 may include a digital data collection program that includes a digital survey. Various embodiments of the digital data collection program may utilize some, all, or none of several functionalities, tools, components, or processes such as data processing, resource allocation, monitoring activities, disk and file management, communications, presentations, cybersecurity, artificial intelligence, machine learning, etc. The digital data collection program may be compiled, or otherwise produced, using machine code that can be executed by the computing device 104 or mobile device 106. Compilation of the digital data collection program or portions thereof may be fully automated and/or incorporate agent-assisted automation. For instance, the digital data collection program may utilize human agents 210 and/or automated agents 214 that provide data collection information that includes textual data of one or more queries that can be distributed to the user 110 via the computing device 104 or mobile device 106. Any number of human agents 210 can be employed, utilized, or authorized by the enterprise system 200. Non-limiting examples of human agents 210 can include pollsters, surveyors, researchers, consultants, advisors, managers, sales team members, etc. In one example embodiment, compilation of the digital data collection program utilizes a Platform as a Service (PaaS) or Infrastructure as a Service (IaaS) that the human agents 210 access to compile the digital data collection program. A PaaS does not permit the human agents 210 to manage or control the underlying cloud infrastructure, but this service may enable the human agents 210 to deploy user-created or acquired applications onto the cloud infrastructure using programming languages and tools provided by the provider of the application. A IaaS provides the human agents 210 with permission to provision processing, storage, networks, and other computing resources as well as run arbitrary software (e.g., operating systems and applications) thereby giving the human agents 210 full control over operating systems, storage, deployed applications, and potentially select networking components (e.g., host firewalls).

Human agents 210 may utilize agent devices 212 to assist in compiling the digital data collection program. The agent devices 212 can be a personal computer, a smart phone, or tablet computing device, and/or other mobile/computing device(s). Further, in some examples, the diagrammatic representation of the components of user device 104, 106 also apply to the agent devices 212. Agent devices 212 individually or collectively include input and output devices, (e.g., a touch screen, a monitor, a keyboard, etc.) for the human agent(s) 210 to input and receive information. Other non-limiting examples of input and output devices or components utilized by the agent devices 212 include one or more of each, any, and all of a keypad, a wireless or wired keyboard, a touch-screen, a touchpad, a microphone, a mouse, a joystick, a pointer device, a button, a switch, a light, an LED, a soft key, an infrared sensor, personal response device (e.g., student response systems or "clickers"), a camera (e.g., a digital camera), a buzzer, a bell, a printer and/or other input and output device(s). Inputs made via the input/output devices of the agent devices 212 by one or more human agents 210 can be made via voice, text or graphical indicia selections in order to facilitate compilation of the digital data collection program. According to various embodiments, agent devices 212 may primarily serve as inputs or outputs to the computing system 206 of the enterprise system 200.

Automated agents 214 may incorporate or otherwise utilize artificial intelligence to facilitate compilation of the digital data collection program. For instance, the automated agents 214 may generate queries to be asked as part of the digital data collection program. Automated agents 214 may also perform text-to-speech (TTS) processing of textual data to generate audio data. According to various embodiments, automated agents 214 may primarily serve as inputs or outputs to the computing system 206 of the enterprise system 200.

The enterprise system 200 can be configured to generate data manually or to obtain data from a third party source such as, for example, a cloud storage service or remote database. Such data that may be generated, downloaded, or otherwise obtained may include, for example, industry-specific data that can be used by a computing system 206 to analyze and compare aggregated response data from the user 110 to measure performance of the enterprise relative other enterprises of a similar industry. In one example, the automated agent 214 or human agents 210 may access third party systems using a software application (e.g., an integrated mobile software application or an application programming interface (API) software application) compatible with the third party system that can be integrated with the computing system 206 and accessible via the agent devices 212 to facilitate communication between software and systems by mapping computer-readable commands and data formats between systems. In another embodiment, the human agents 2010 the third party system using a web browser application software to access a web-based software interface (e.g., a website).

The computing system 206 may have various components similar to the user device 104, 106. For instance, in one example the computing system 206 may include at least one of each of a processing device 220, and a memory device 222 for use by the processing device 220, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, enterprise data, company data, industry data, historical data, files downloaded or received from other devices, and other data items preferred by the enterprise or required or related to any or all of the applications or programs 230. In one non-limiting example, the computing system 206 may include applications or programs 230 that incorporate software that provides text-to-speech functionality.

As illustrated, the computing system 206 includes an input/output system 236, which generally refers to, includes, and/or is operatively coupled with agent devices 212 and automated agents 214, as well as various other input and output devices. According to various embodiments, the computing system 206 may be used to distribute the digital data collection program as, for example a Software-as-a-Service (SaaS) that can be accessed by the user device 104, 106 on a subscription basis via a web browser or mobile application. SaaS may provide a user 110 with the capability to use applications running on a cloud infrastructure of the enterprise system 200, where the applications are accessible using the user device 104, 106 via a thin client interface such as a web browser and the user 110 is not permitted to manage or control the underlying cloud infrastructure (i.e., network, servers, operating systems, storage, or specific application capabilities that are not user-specific) of the enterprise system 200.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device 104, 106.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, near-field communication device, and other transceivers. In addition, GPS (Global Positioning System) may be included for navigation and location-related data exchanges, ingoing and/or outgoing. Communications may also, or alternatively, be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of this description. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMAX, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, frames using frame relay, voice, video, data, and other suitable information between network addresses. The network 258 may also include one or more local area networks (LANs), radio access networks (RANs), metropolitan area networks (MANs), wide area networks (WANs), personal area networks (PANs), WLANs, campus area network (CAN), metropolitan area network (MAN), storage-area network (SAN), all or a portion of the internet and/or any other communication system or systems at one or more locations.

The network 258 may incorporate a cloud platform/data center that support various service models including Platform as a Service (PaaS), Infrastructure-as-a-Service (IaaS), and/or Software-as-a-Service (SaaS). The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private, community, and/or public).

Two external systems 202 and 204 are expressly illustrated in FIG. 1, representing any number and variety of data sources, third-party PaaS, third-party IaaS, external databases, business entities, enterprises, organizations, institutions, companies, government entities, clubs, and groups of any size are all within the scope of the description. In at least one example, the external systems 202 and 204 third-party systems that store industry-specific data that can communicate with or be accessed by the agent devices 212. According to various embodiments, external systems 202 and 204 may utilize software applications that function using external resources that are available through a third-party provider such as SaaS, PaaS, or IaaS service models. Such external systems 202 include the third party systems accessible via the agent devices 212 using a software application (e.g., an integrated mobile software application or an API software application) that can be integrated with the computing system 206 to facilitate communication between software and systems by mapping computer-readable commands and data formats between systems. In another embodiment, the third party system may be accessible by the agent devices 212 using a web-based software interface (e.g., a website).

In certain embodiments, one or more of the systems described herein such as the user device (referring to either or both of the computing device 104 and the mobile device 106), the enterprise system 200, and/or the external systems 202 and 204 are, include, or utilize virtual resources. Such virtual resources include cloud resources or virtual machines. The virtual resources may utilize a cloud-computing configuration to provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud-computing configuration so that the resources may be shared as needed.

According to one embodiment, a user 110 may initiate an interaction with the enterprise system 200 in response to receiving an electronic communication (e.g., email, SMS text message, an instant chat message, a social media message, etc.). For instance, periodically or at periodic intervals, the enterprise system 200 may distribute a digital data collection program to the user 110 via an embedded link, a web address (e.g., a uniform resource locator (URL)), a scannable code (e.g., a quick response (QR) code, barcode, etc.). Response data input by the user 110 may then be collected in response to the user 110 responding to queries included in the digital data collection program. This collected response data may then be stored to the storage device 224 or to a third party storage resource such as, for example a cloud storage service or remote database. Additionally, this collected response data may be aggregated in order to allow the enterprise to have a sampling of responses from multiple users 110.

According to one embodiment, the collected response data may be stored to a relational database that stores associations associated with the response data such as, for example, based on classification of the user 110. For instance, the users 110 may be classified based on their titles, position, level of authority within the enterprise, department, job functions, geographic regions, work shifts, level of association with the enterprise, group assignment, team, or various other classifiers. Example position or title classifications may include senior management, middle managers, specialists, administration, administrative staff, supervisors, operators, contractors, contractor supervisors, contractor operators, employees, etc. Example department classifications may include accounting, management, customer service, information technology (IT), legal, human resources, sales, manufacturing, logistics, marketing, etc. Example association classifications may label the respondents based on user characteristics such as political party affiliation, intrinsic characteristics, economic affluence, education level, etc. Storing the collected response data to the relational database may facilitate sorting of the data to generate a report based on the responses. According to one embodiment, the enterprise system 200 may maintain the interaction or relational database that stores such data in order to access this data in future user interactions. In another embodiment, external systems 202, 204 may store the interaction or relational database.

The collected response data may also have metadata associated therewith that can be accessed by the enterprise system 200. The metadata may include, for example, (i) sequencing data representing the data and time when the response data was created, (ii) the amount of time it took for the user 110 to respond to each query or to complete the digital data collection program, (iii) user classification data (e.g., based on position, title, department, associations, or other labels attributed to the respondents), (iv) industry identification data identifying the industry associated with the data, and/or (v) other types of data that could be helpful to the enterprise in order to classify and analyze the collected response data.

In some instances or interactions, the actual identities of the user 110 may be anonymous. In other instances, various user-specific information about the user 110 may be obtained such as, for example, an email address, phone number, a user device internet protocol (IP) address, user account name, social media profile, etc. In such instances where user-specific information is obtained, the enterprise system 200 may leverage source identification software that processes source data of the user 110. When a user 110 accesses the enterprise system 200 through a user device 104, 106, the enterprise system 200 can capture elements of user data. For instance, the enterprise system 200 can determine geographic location of the user 110 based on the user device IP address of the user device 104, 106. In some instances, the enterprise system 200 may store user profiles or enterprise profiles of specific users/enterprises associated with the user-specific or enterprise specific information and as such may match incoming response data of a specific user or enterprise with existing data associated with the user/enterprise.

According to various embodiments, the human agents 210 and/or automated agent 214 may access an interaction database storing interaction data classifying aspects of the collected response data. For instance, the interaction data may classify the collected response data based on target attributes that are being assessed or tested with the queries included in the digital data collection program. According to some embodiments, the enterprise system 200 may apply the collected response data to a trained model, such as the artificial intelligence system or various models that incorporate machine-learning algorithms in order to categorize or otherwise classify the collected response data. For example, the interaction data may be classified, without limitation, according to organizational objectives, leadership, processes, influences, attitudes, rules, tasks, etc. In one particular embodiment, the target attributes may be used to analyze the risk culture of an enterprise, where psychological safety, risk readiness, integration, strength, maturity, and alignment are assessed and analyzed.

According to some embodiments, the user 110, via user device 104, 106, can access the enterprise system 200 using an Internet browser software application to access a web server in order to display a webpage of the enterprise. Alternatively, according to other embodiments, the enterprise system 200 can be accessed through an enterprise mobile software application installed on the user device 104, 106 that displays a GUI screen. In accessing the enterprise system 200, the user device 104, 106 transmits a user-interface-transmit command to the web server that can include the device IP address for the user device 104, 106 and system configuration data. In response to the user interface transmit command, the web server returns enterprise display data. Upon receiving the enterprise display data, the user device 104, 106 processes the display data and renders a GUI screen that is presented to the user 110, such as a provider website or a GUI within a provider mobile software application.

In some embodiments, the user device 104, 106 may also transmit system configuration data to the enterprise system 200, which may be used to authenticate the user device 104, 106. System configuration data can include, without limitation: (i) a unique identifier for the user device 104, 106 (e.g., a media access control (MAC) address hardcoded into a communication subsystem); (ii) a MAC address for the local network (e.g., a router MAC address); (iii) copies of key system files that are unlikely to change between instances when accessing the enterprise system 200; (iv) a list of applications running or installed on the user device 104, 106; and (v) any other data useful for ascertaining the identifiers underlying a support request or user communication.

As used herein, an artificial intelligence (AI) system, AI algorithm, AI module, program, and the like, generally refer to computer-implemented programs that are suitable to simulate intelligent behavior (i.e., intelligent human behavior) and/or computer systems and associated programs suitable to perform tasks that humans are typically required to performed. An AI system may include, for example, at least one of a series of associated if-then logic statements, a statistical model suitable to map raw sensory data into symbolic categories and the like, or a machine-learning program. A machine learning program, machine learning algorithm, or machine learning module, as used herein, is generally a type of AI including one or more algorithms that can learn and/or adjust parameters based on input data provided to the algorithm. In some instances, machine learning programs, algorithms, and modules are used at least in part in implementing AI functions, systems, and methods.

AI and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine-learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine-learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine-learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine-learning module may include a machine learning acceleration logic, e.g., a fixed function matrix multiplication logic, in order to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DB-SCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

As described herein, text-to-speech (TTS) technology may utilize various speech synthesis methods. TTS technology may incorporate concatenative TTS, format synthesis, parametric TTS, and/or hybrid deep neural network functions, systems, and methods. Concatenative TTS divides and stores recorded speech in very short units of sound, such as phonemes, and a TTS engine can search a database for the stored recorded units that match the input text and concatenate these units together to constitute sentences and produce an audio file. Format synthesis may produce speech by generating artificial signals based on rules that mimic format structure and spectral properties of natural speech by incorporating acoustic parameters (e.g., voicing, frequency, noise levels, etc.). Parametric TTS utilizes a hidden semi-Markov model and may process text to extract linguistic features (e.g., phonemes, duration, etc.) as well as inherent features (e.g., cepstrum, spectrogram, fundamental frequency, etc.) used in audio processing that can be fed into a trained Vocoder mathematical model that uses approximations of parameters that make the speech (e.g., frequency, magnitude spectrum, etc.) so that when a waveform is generated these approximations are applied to affect speech rate, intonation, and other qualities of speech. The hybrid deep learning approach may utilize a deep neural network that models a relationship between textual inputs and acoustic realizations based on maximum likelihood parameter generation trajectory smoothing. In general, deep neural network approaches are becoming more commonplace in TTS technology and speech synthesis.

In general, machine-learning models may include supervised techniques that can operate on labeled content data and include instructions informing the system which outputs are related to specific input values, or unsupervised learning techniques that can identify and characterize hidden structures of unlabeled content data.

In such instances, supervised software processing can rely on iterative training techniques and training data to configure neural networks with an understanding of individual words, phrases, subjects, sentiments, and parts of speech. As an example, training data is utilized to train a neural network to recognize that certain phrases all relate to the same general subject matter when the words are observed in proximity to one another at a significant frequency of occurrence. Supervised learning software systems are trained using content data that is well-labeled or "tagged." During training, the supervised software systems learn the best mapping function between a known data input and expected known output (i.e., labeled or tagged content data). Supervised learning software then uses the best approximating mapping learned during training to analyze unforeseen input data (never seen before) to accurately predict the corresponding output. Supervised learning software systems often require extensive and iterative optimization cycles to adjust the input-output mapping until they converge to an expected and well-accepted level of performance, such as an acceptable threshold error rate between a calculated probability and a desired threshold probability. Supervised learning software systems implement techniques that include, without limitation, Latent Semantic Analysis ("LSA"), Probabilistic Latent Semantic Analysis ("PLSA"), Latent Dirichlet Allocation ("LDA"), and Bidirectional Encoder Representations from Transformers ("BERT").

In contrast, unsupervised learning software systems can perform training operations on unlabeled data and less requirement for time and expertise from trained data scientists. Unsupervised learning software systems can be designed with integrated intelligence and automation to automatically discover information, structure, and patterns from content data. Unsupervised learning software systems can be implemented with clustering software techniques that include, without limitation, K-means clustering, Mean-Shift clustering, Density-based clustering, Spectral clustering, Principal Component Analysis, and Neural Topic Modeling ("NTM").

The user device 104, 106 or computing system 206 that performs the TTS processing may utilize one or more supervised or unsupervised software processing techniques to generate speech. Suitable software processing techniques can include, without limitation, Latent Semantic Analysis, Probabilistic Latent Semantic Analysis, Latent Dirichlet Allocation, Non-Matrix Factorization, Correlated Topic Model ("CTM"), and/or K-Means or other types of clustering.

In general, neural networks are a subfield of machine learning that take inspiration from biological neural networks. A neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks. Neural networks are trained using training set content data that comprise sample tokens, phrases, sentences, paragraphs, or documents for which desired subjects, content sources, interrogatories, or sentiment values are known. A labeling analysis is performed on the training set content data to annotate the data with known subject labels, interrogatory labels, content source labels, or sentiment labels, thereby generating annotated training set content data. For example, a labeling software application can be used by a human agent 210 to review training set content data to identify and tag or "annotate" various parts of speech, subjects, interrogatories, content sources, and sentiments. The training set content data may then be fed to a content driver software service neural network to identify subjects, content sources, or sentiments and the corresponding probabilities.

In one example neural network, the analysis might identify that there is a 35% probability that particular text represents a question, and accordingly the speech should be synthesized in accordance with how a question is spoken. If the annotations indicate the text is, in fact, a question, an error rate can be taken to be 65% or the difference between the calculated probability and the known certainty. Then parameters to the neural network are adjusted (i.e., constants and formulas that implement the nodes and connections between node), to increase the probability from 35% to ensure the neural network produces more accurate results, thereby reducing the error rate. This training process is run iteratively on different sets of training set content data to continue to increase the accuracy of the neural network.

Neural networks may perform a supervised learning process where known inputs and known outputs are utilized to categorize, classify, or predict a quality of a future input. However, additional or alternative embodiments of the machine-learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine-learning algorithm may adjust the weight coefficients until any error in the output data generated by the algorithm is less than a predetermined, acceptable level. For instance, the training process may include comparing the generated output, produced by the network in response to the training data, with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between $-1$ and $1$) may be used to modify the previous coefficient, e.g., a propagated value. The machine-learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

Various neural networks exist that may be utilized by various AI systems described herein. For instance, an artificial neural network (ANN), also known as a feedforward network, may be utilized, e.g., an acyclic graph with nodes arranged in layers. A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266.

It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is performed.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine-learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 2A:
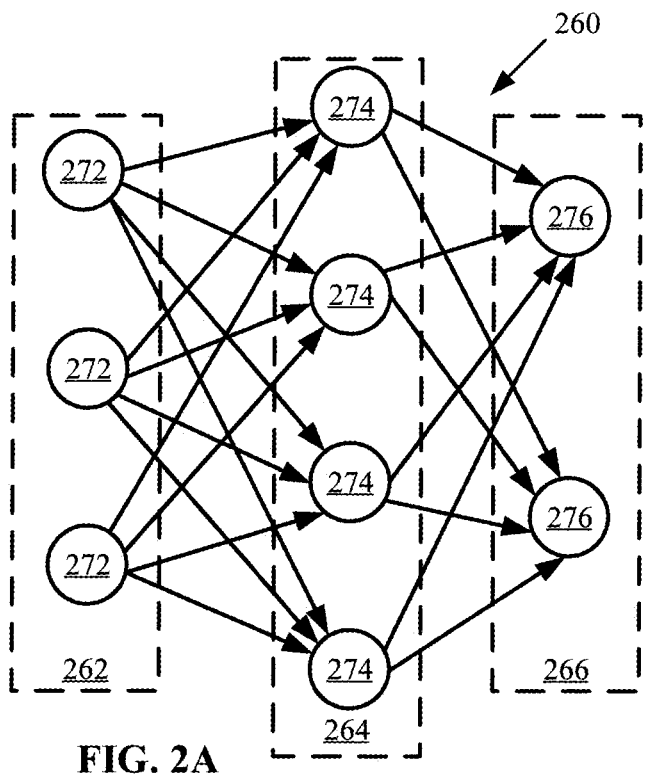
FIG. 2A is a diagram of a feedforward network, according to at least one embodiment, utilized in machine learning.
Figure 2C:
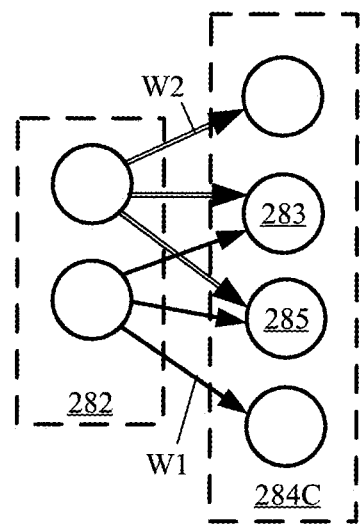
FIG. 2C is a diagram of a portion of the convolution neural network of FIG. 2B, according to at least one embodiment, illustrating assigned weights at connections or neurons.
Figure 2B:
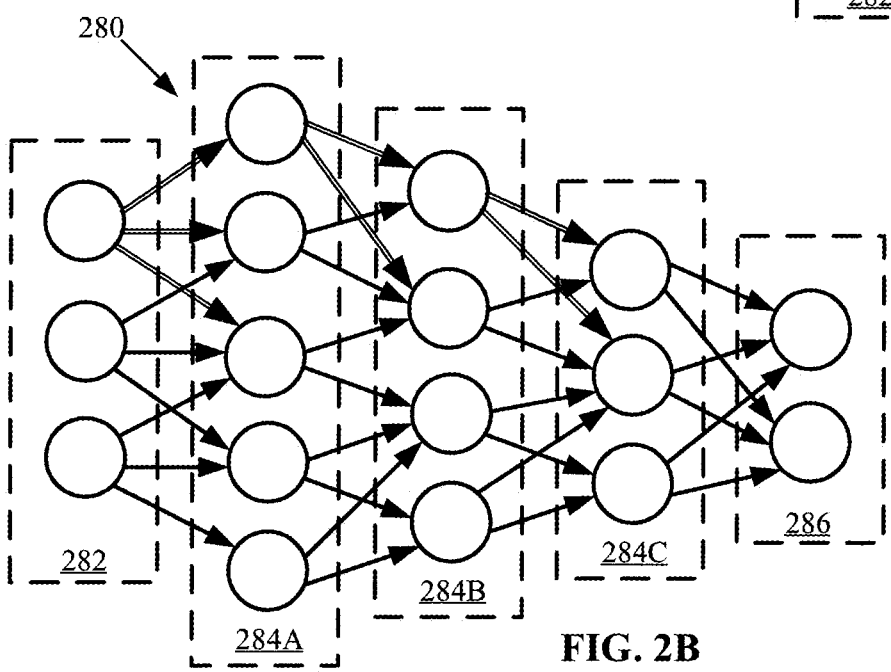
FIG. 2B is a diagram of a convolution neural network, according to at least one embodiment, utilized in machine learning.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
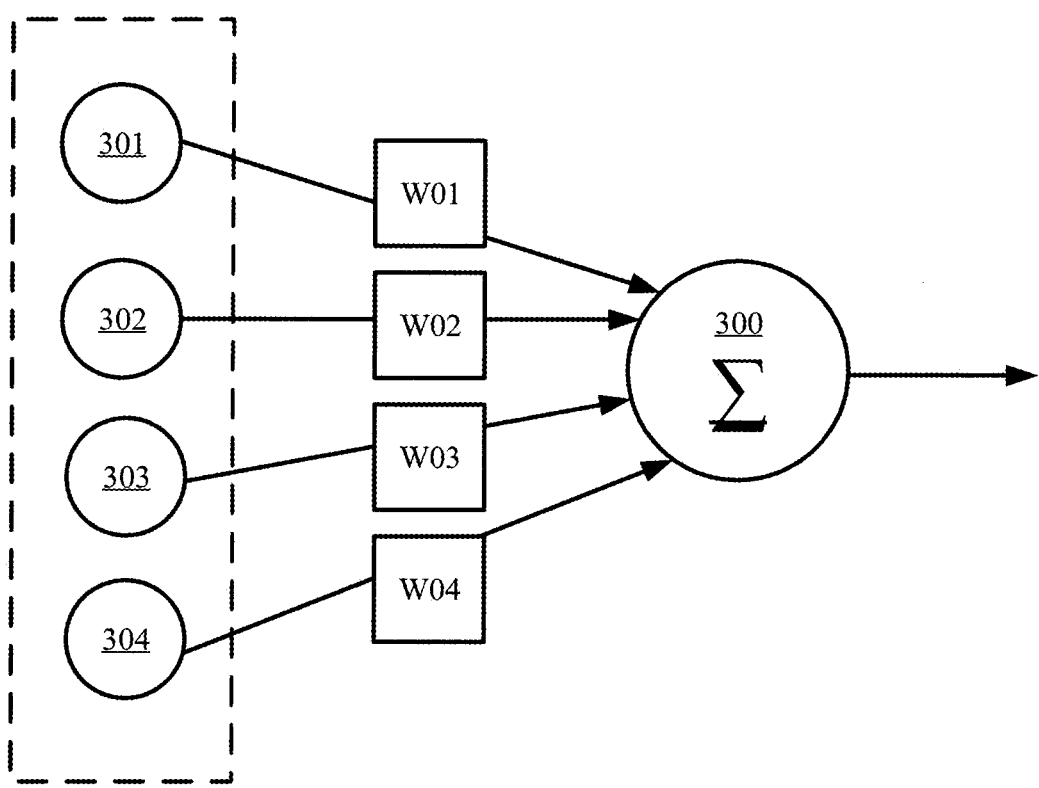
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine-learning program may include a feedback system suitable to provide the connection(s) between subsequent and previous layers of the network.

Figure 4:
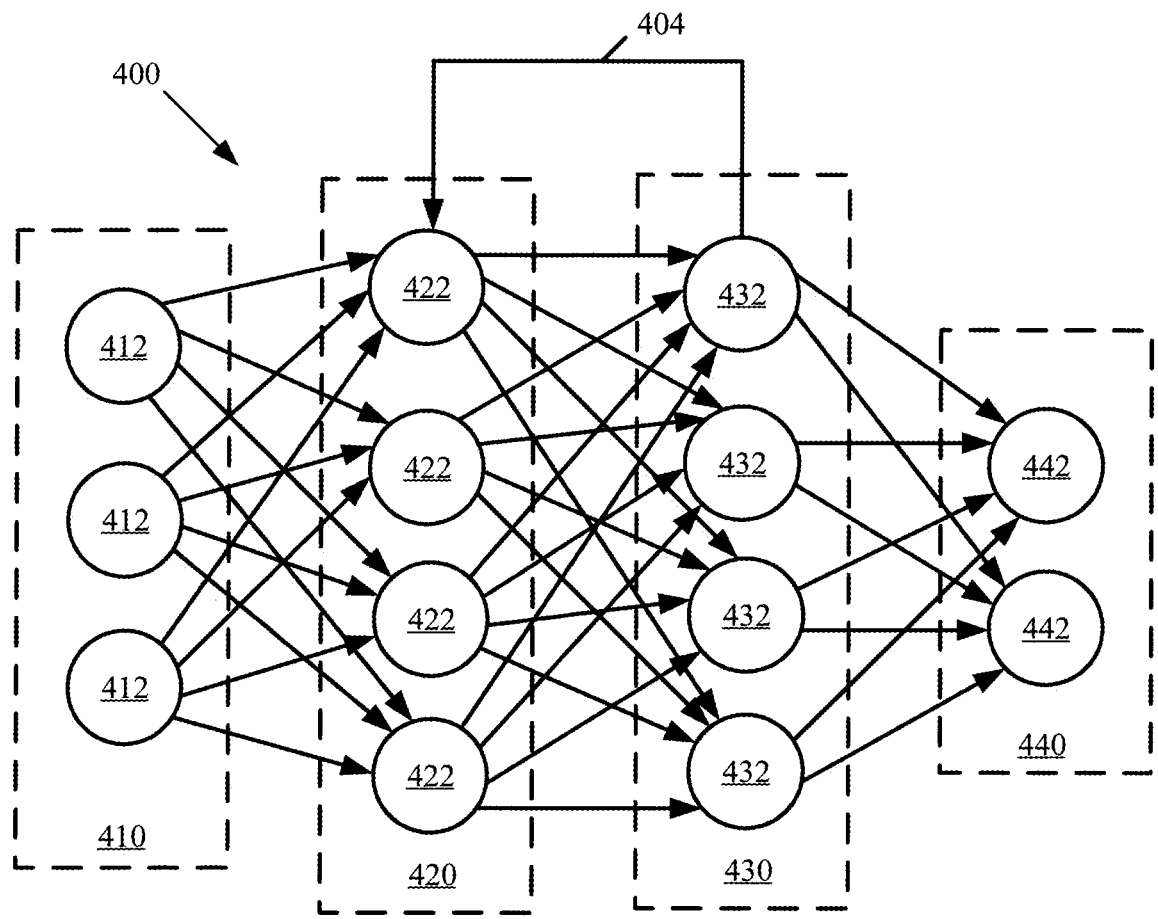
FIG. 4 is a diagram of a Recurrent Neural Network (RNN), according to at least one embodiment, utilized in machine learning.

An example for an RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine-learning program may include one or more support vector machines. A support vector machine may be configured to determine a category to which input data belongs. For example, the machine-learning program may be configured to define a margin using a combination of two or more of the input variables and/or data points as support vectors to maximize the determined margin. Such a margin may generally correspond to a distance between the closest vectors that are classified differently. The machine-learning program may be configured to utilize a plurality of support vector machines to perform a single classification. For example, the machine-learning program may determine the category to which input data belongs using a first support vector determined from first and second data points/variables, and the machine-learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine-learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers).

Generally, the neural network(s) of the machine-learning program may include a relatively large number of layers, e.g., three or more layers, and may be referred to as deep neural networks. For example, the node of each hidden layer of a neural network may be associated with an activation function utilized by the machine-learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
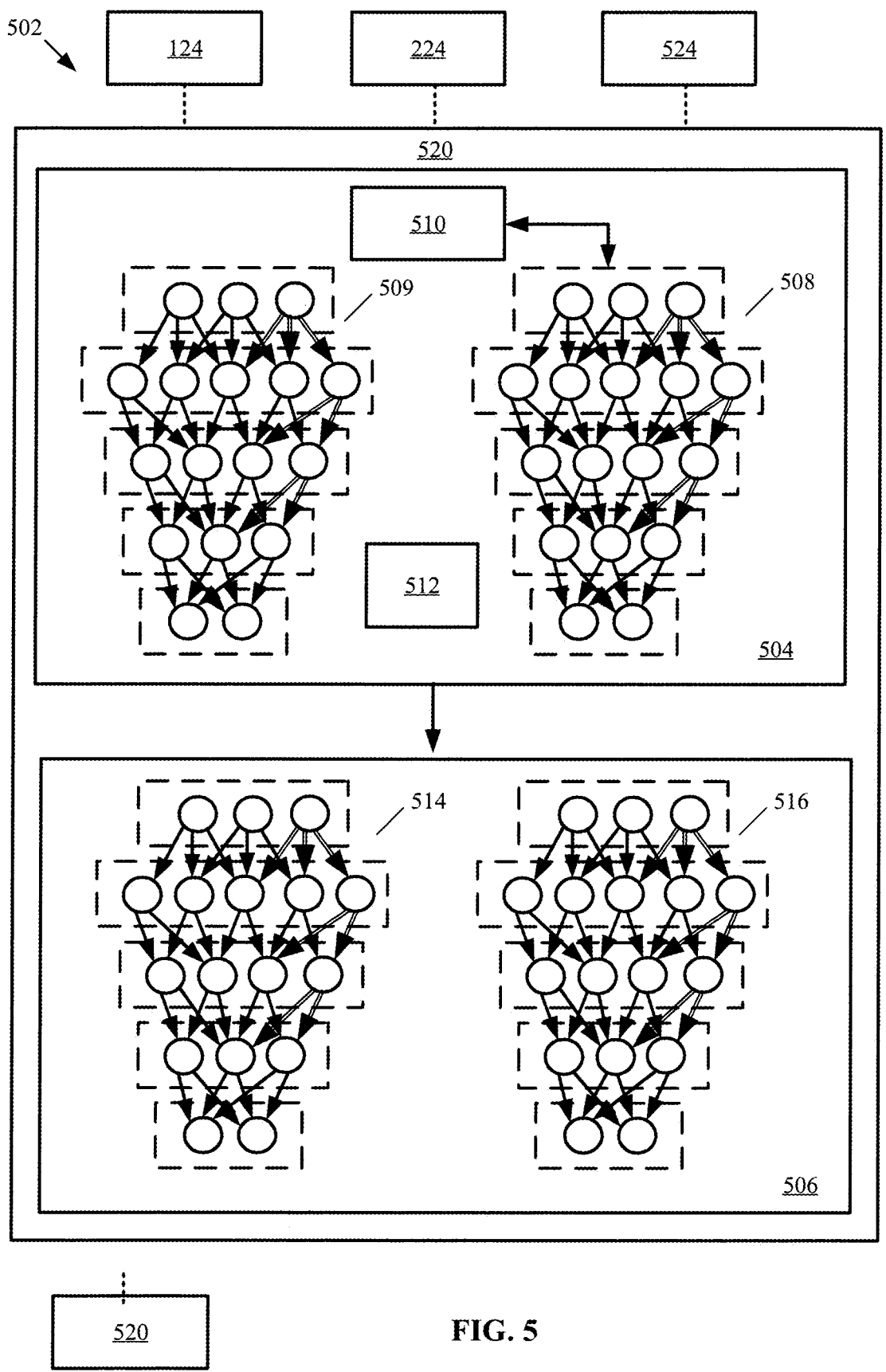
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., storage device 124, memory device 122, storage device 224, and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, RNNs, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance, and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine-learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine-learning program may include variations, adaptations, and alternatives suitable to perform the operations necessary for the system, and the present disclosure is equally applicable to such suitably configured machine learning and/or artificial intelligence programs, modules, etc. For instance, the machine-learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine-learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Those of skill in the art will also appreciate that other types of neural networks may be used to implement the systems and methods disclosed herein, including, without limitation, radial basis networks, deep feed forward networks, gated recurrent unit networks, auto encoder networks, variational auto encoder networks, Markov chain networks, Hopefield Networks, Boltzman machine networks, deep belief networks, deep convolutional networks, deconvolutional networks, deep convolutional inverse graphics networks, generative adversarial networks, liquid state machines, extreme learning machines, echo state networks, deep residual networks, Kohonen networks, and neural turning machine networks, as well as other types of neural networks.

To implement natural language processing technology, suitable neural network architectures can include, without limitation: (i) multilayer perceptron ("MLP") networks having three or more layers and that utilizes a nonlinear activation function (mainly hyperbolic tangent or logistic function) that allows the network to classify data that is not linearly separable; (ii) convolutional neural networks; (iii) recursive neural networks; (iv) recurrent neural networks; (v) Long Short-Term Memory ("LSTM") network architecture; (vi) Bidirectional Long Short-Term Memory network architecture, which is an improvement upon LSTM by analyzing word, or communication element, sequences in forward and backward directions; (vii) Sequence-to-Sequence networks; and (viii) shallow neural networks such as word2vec (i.e., a group of shallow two-layer models used for producing word embedding that takes a large corpus of alphanumeric content data as input to produces a vector space where every word or communication element in the content data corpus obtains the corresponding vector in the space).

With respect to clustering software processing techniques that implement unsupervised learning, suitable neural network architectures can include, but are not limited to: (i) Hopefield Networks; (ii) a Boltzmann Machines; (iii) a Sigmoid Belief Net; (iv) Deep Belief Networks; (v) a Helmholtz Machine; (vi) a Kohonen Network where each neuron of an output layer holds a vector with a dimensionality equal to the number of neurons in the input layer, and in turn, the number of neurons in the input layer is equal to the dimensionality of data points given to the network; (vii) a Self-Organizing Map ("SOM") having a set of neurons connected to form a topological grid (usually rectangular) that, when presented with a pattern, the neuron with closest weight vector is considered to be the output with the neuron's weight adapted to the pattern, as well as the weights of neighboring neurons, to naturally find data clusters; and (viii) a Centroid Neural Network that is premised on K-means clustering software processing techniques.

Figure 6:
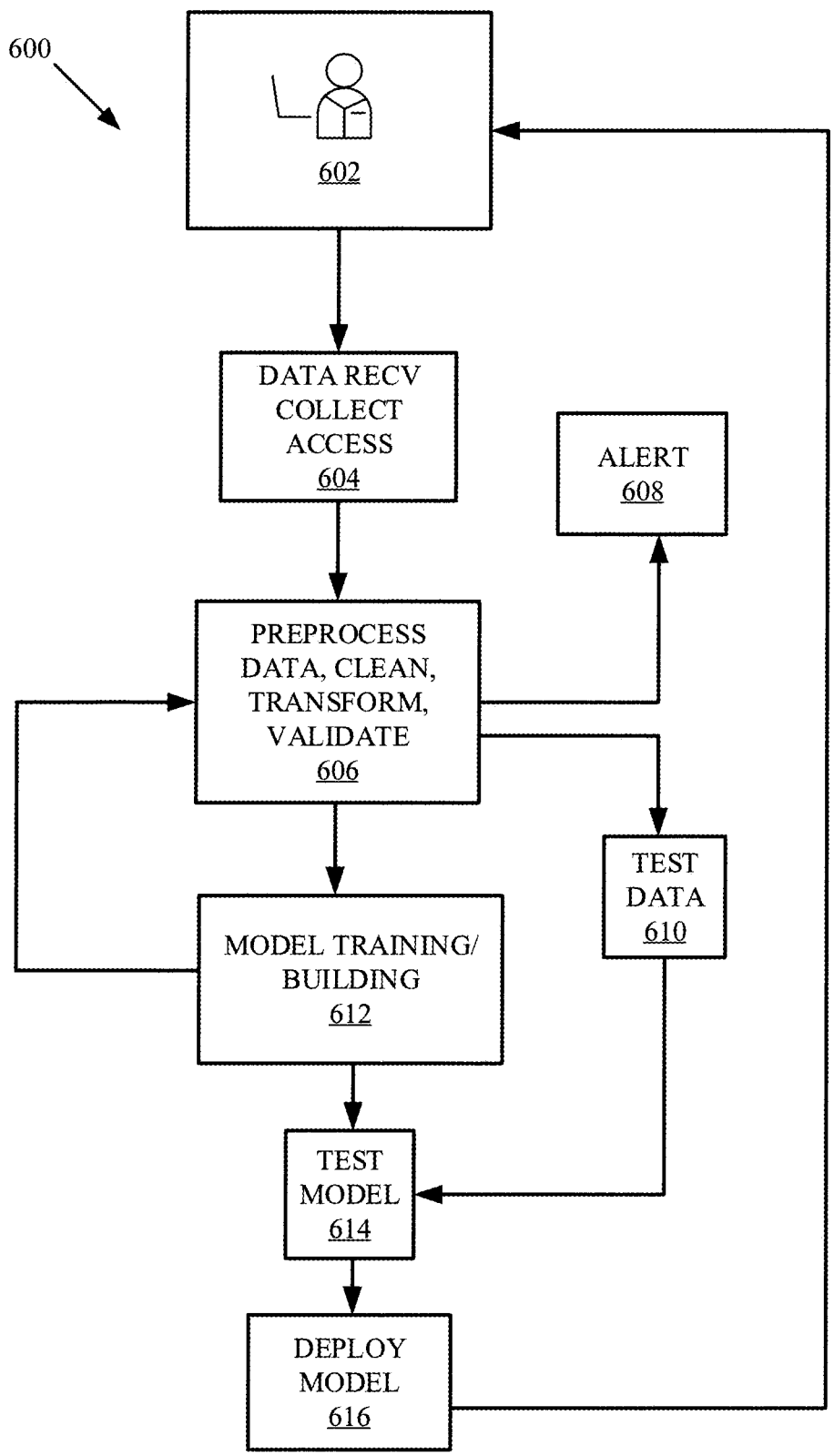
FIG. 6 is a flow chart representing a method, according to at least one embodiment, of model development and deployment by machine learning.

FIG. 6 is a flow chart representing a method 600, according to at least one embodiment, of model development and deployment by machine learning. The method 600 represents at least one example of a machine learning workflow in which steps are implemented in a machine-learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606, the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning workflow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Figure 7:
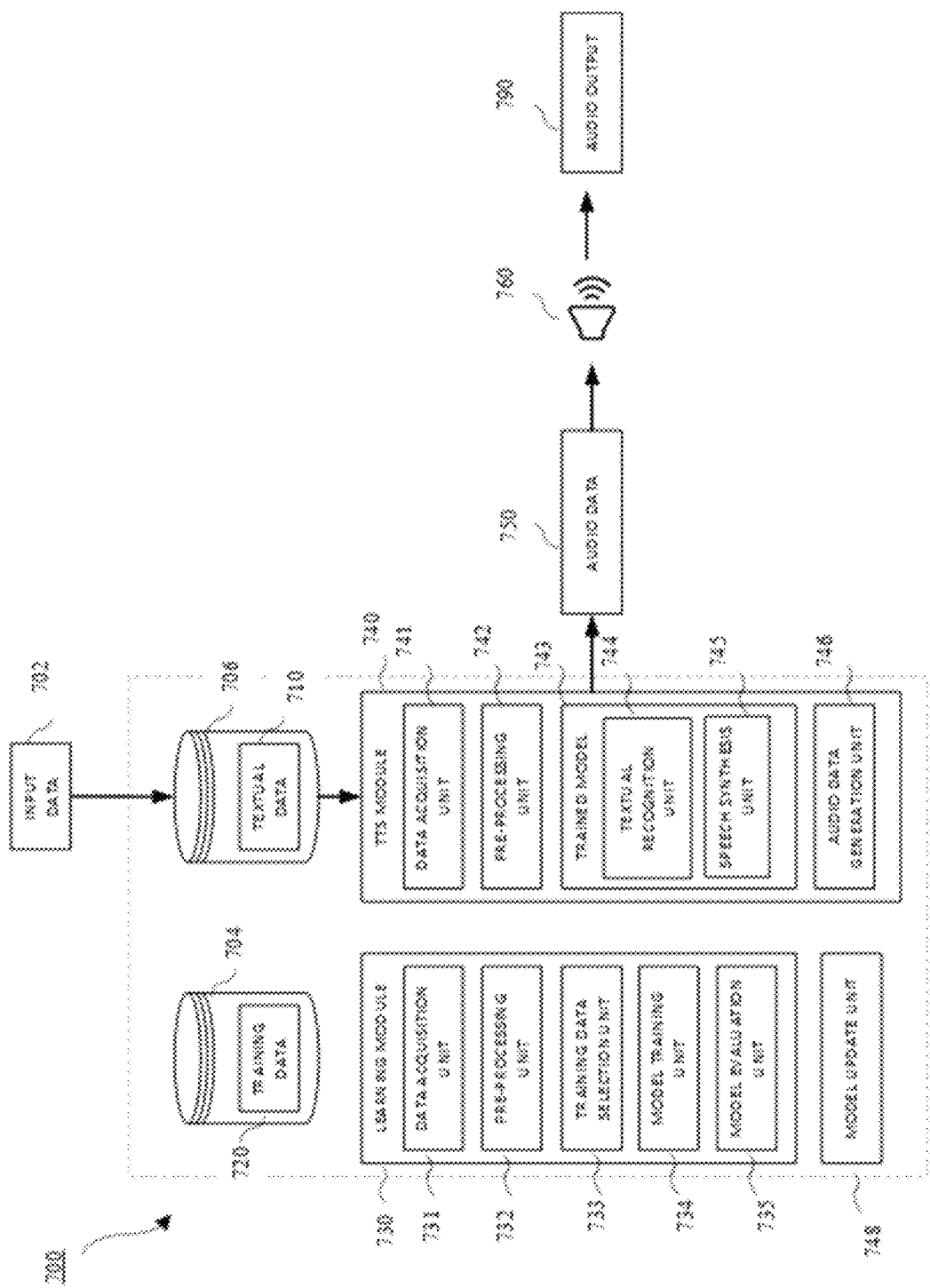
FIG. 7 depicts an example computer system for text-to-speech audio processing and audio distribution via an electroacoustic transducer, in accordance with an embodiment of the present invention.
Figure 12:
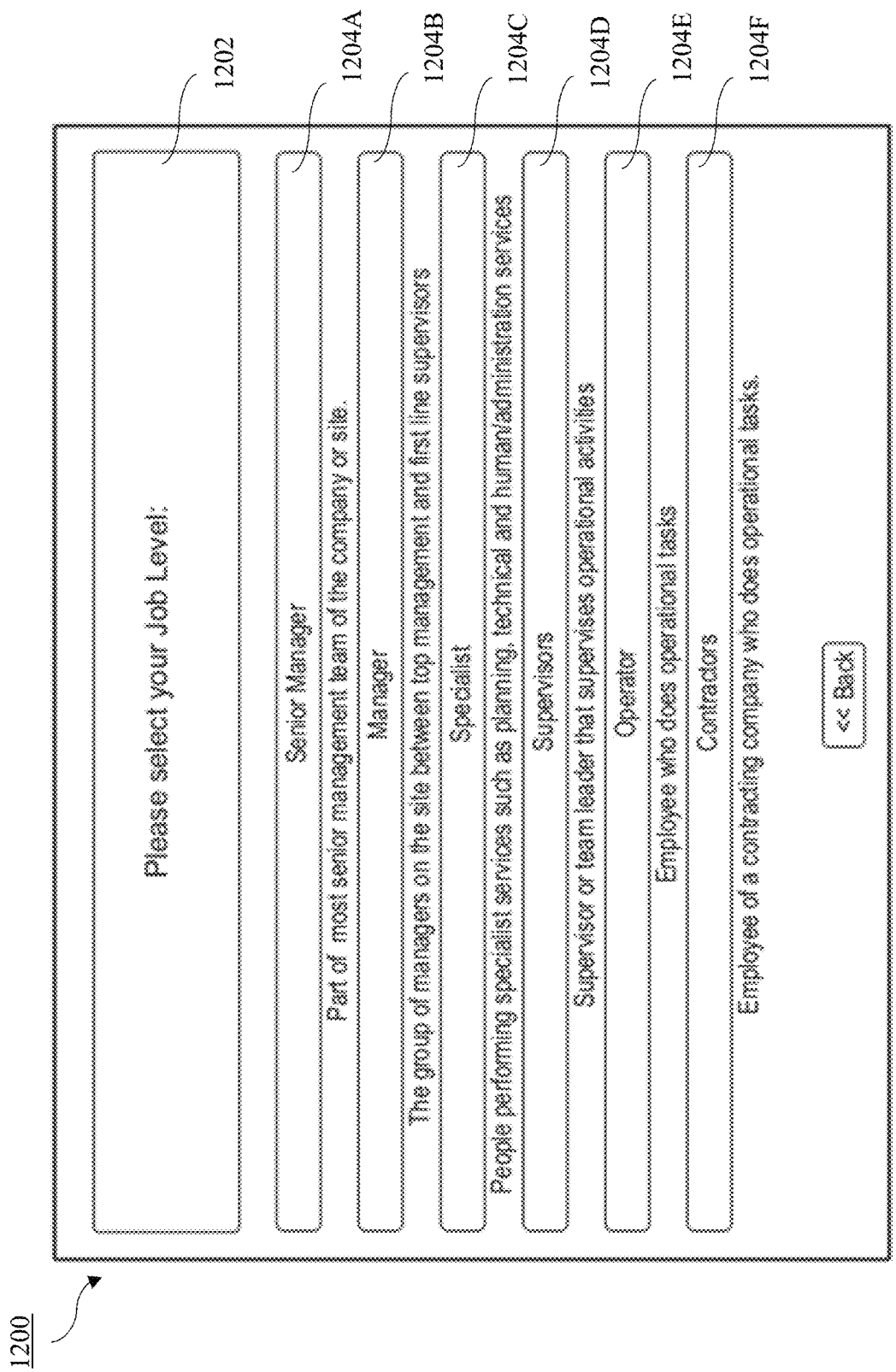
FIG. 12 depicts an example display screen of a component of a digital data collection program that includes a query related to job level, in accordance with an embodiment of the present invention.

FIG. 7 depicts an example computer system 700 for TTS audio processing and audio distribution via an electroacoustic transducer, in accordance with an embodiment of the present invention. In particular, the example system 700 implements TTS data processing of textual data 710 to synthesize audio data 750 and produce an audio output 790. The computer system 700 may include a learning module 730 that processes training data 720 to generate a trained TTS module 740 that processes the textual data 710 to generate the audio data 750. An electroacoustic transducer 760 may then be used to produce the audio output 790 from the audio data 750.

In particular, the computer system 700 receives input data 702 (e.g., data collection information) that the computer system 700 processes as part of a digital data collection program (e.g., digital survey) that is compiled and can be distributed to one or more computing devices via the electroacoustic transducer 760. The input data 702 may include textual data 710 of one or more queries to be included in the digital data collection program, where the textual data 710 may be stored to a storage device 706. Text-to-speech data processing may be performed on the textual data 710 using the TTS module 740 in order to produce the audio data 750.

As part of training the TTS module 740, the computer system 700 may use training data 720 that are stored to a storage device 704. According to one embodiment, a learning module 730 includes a data acquisition unit 731 that acquires the training data 720. Further, a pre-processing unit 732 may processing the training data 720 into a predetermined format by, for example, analyzing the training data 720 and selecting relevant portions of the training data 720 that can be used to process text and generate speech. A training data selection unit 733 may then select the necessary data from the pre-processing unit 732 to train the TTS model based, for example, on selected criterion. The model training unit 734 may then train the TTS model to output speech according to text. The TTS model that is trained may be or include any machine learning model, neural network, and/or AI algorithm discussed herein. The model evaluation unit 735 may evaluate the output of the model training unit 734 and may provide inputs to the model training unit 734 in order to tweak or otherwise modify the TTS model in order to improve the output. Once the TTS model is trained, the TTS module 740 may utilize the trained TTS model.

In particular, the TTS module 740 may include a data acquisition unit 741 that acquires the textual data 710 and a pre-processing unit 742 that processes the textual data 710 into a predetermined format that can be used to process text and generate speech. For instance, the pre-processing unit 742 can utilize audio waveform parameters assigned to aspects of the textual data 710. The TTS module 740 may then apply the trained TTS model 743 to the pre-processed textual data 710. The TTS model 743 may incorporate, for example, concatenative TTS, format synthesis, parametric TTS, and/or hybrid deep neural network by utilizing a textual recognition unit 744 that may perform, for example, word recognition and a speech synthesis unit 745 that synthesizes speech. For instance, this process may incorporate speech patterns, pronunciation, and context. Further, an audio data generation unit 746 may generate audio data 750 that is then processed by the electroacoustic transducer 760 in order to produce the audio output 790.

The audio data 750 may include electronic representation of sound waves that are represented digitally as a sequence of numbers and the audio output 790 may be in the form of a synthetic acoustic waveform FIGS. 8-12 depict example display screens of components 800, 900, 1000, 1100, 1200 of a digital data collection program, in accordance with embodiments of the present invention. In particular, the components may include a language selection component 800 and an introductory component 900, according to various embodiments. Further, embodiments may include a component 1000 that includes a query 1002 related to site location in order for the respondent to select one of the selectable responses 1004 associated with a site location where the respondent works. For instance, the respondent may select an on-site work location (e.g., a building, a project, a campus, a city, a section of a building, etc.), or a remote work location (e.g., home office, city, state, country, etc.). Embodiments may also include a component 1100 that includes a query 1102 related to a department of work of the enterprise in which the respondent works. For instance, the respondent may select one of the selectable responses 1104 associated with branch of the enterprise (e.g., sales, customer service, accounting, etc.), a specific department within a broader branch of the enterprise (e.g., accounts payable, accounts receivable, corporate treasury, financial planning, tax, auditing, etc.) or various other sections of the enterprise. Various embodiments may also include a component 1200 that includes a query 1202 related to job level as well as various selectable responses 1204A-1204F associated with various job levels (e.g., senior manager 1204A, manager 1204B, specialist 1204C, supervisor 1204D, operator 1204E, contractor 1204F, etc.).

FIGS. 13A-13C depict an example environment 1300 and devices 1302, 1304 used as part of a digital data collection program, in accordance with embodiments of the present invention. The environment 1300 may include, for example, a classroom setting, a breakroom, a cafeteria, a computer center, an Internet café, etc. Example input devices 1302 may include a personal computer, a smart phone, or tablet computing device, student response systems or "clickers", and/or other mobile/computing device(s) that can be used to input response data in response to queries presented via the digital data collection program. An example peripheral device 1304 (e.g., an external storage device) is also depicted, which may include a computer readable storage medium for distributing the digital data collection program. For instance, the distribution device 1304 may store computer readable program instructions that can direct a computer, a programmable data processing apparatus, and/or other devices to function in a particular manner, which may include displaying queries included in the digital data collection program.

Figure 14A:
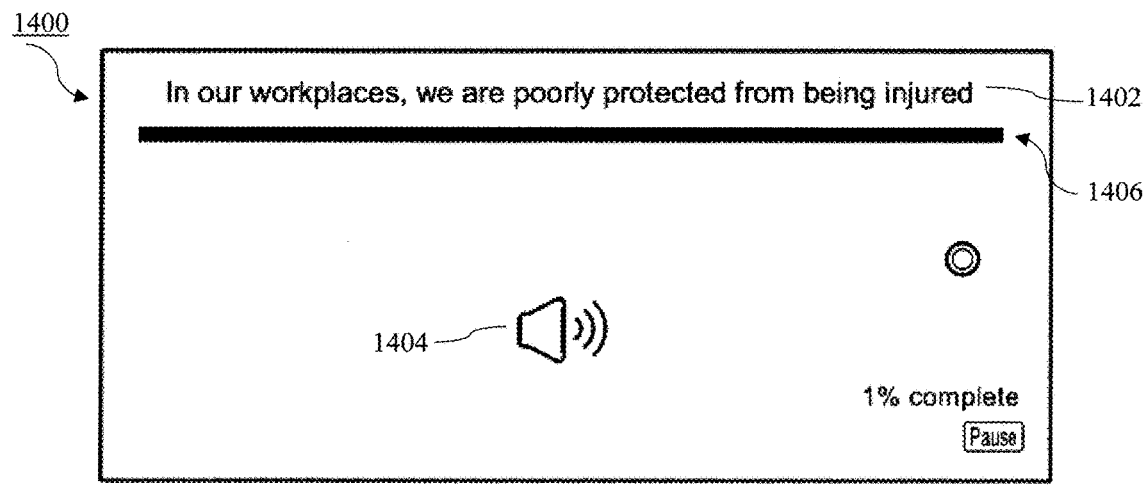
FIG. 14A depicts an example display screen of a component of a digital data collection program that includes a query accompanied by an audio output, in accordance with an embodiment of the present invention.
Figure 14B:
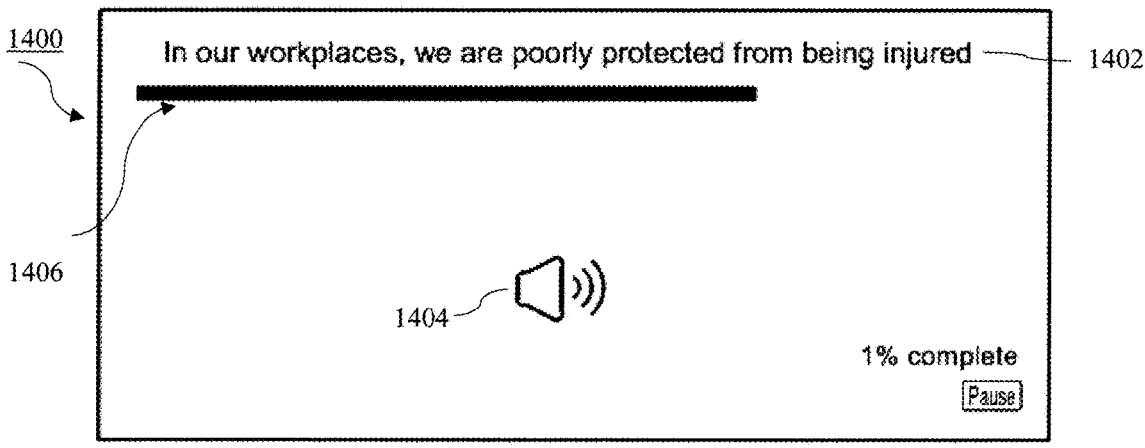
FIG. 14B depicts the example display screen of FIG. 14A, in which a timer associated with time to respond to the query has started depleting resulting in a shortened time to respond, in accordance with an embodiment of the present invention.
Figure 14C:
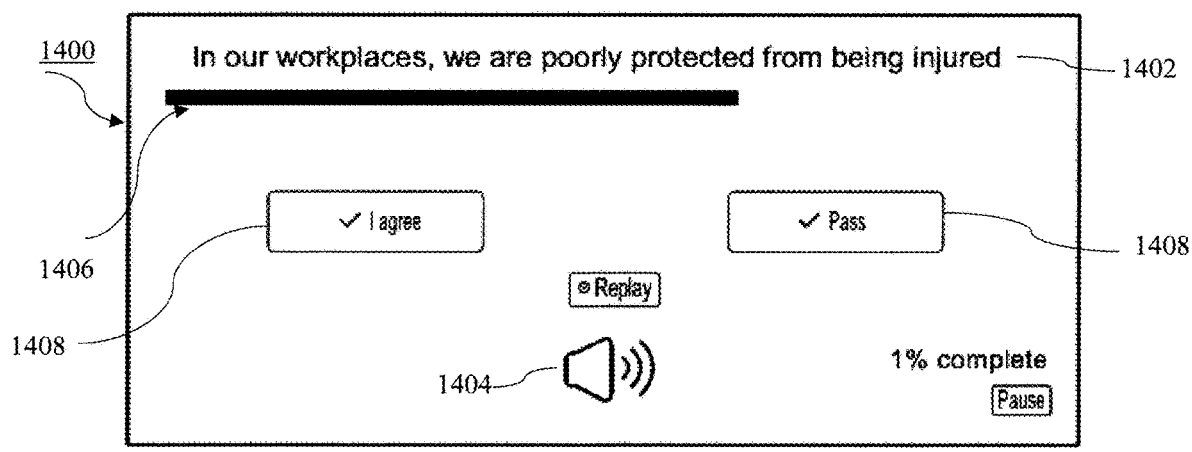
FIG. 14C depicts the example display screen of FIGS. 14A and 14B, in which the time has continued depleting the time to respond and at least two selectable responses to the query are displayed, in accordance with an embodiment of the present invention.

FIGS. 14A-14C depict example display screens of a component 1400 of a digital data collection program that include a query 1402 accompanied by an audio output 1404, where a timer visual 1406 indicating remaining time from a total allotted time in which a respondent is permitted to select a response to the query 1402 is represented. As depicted, when comparing the timer visual 1406 of FIG. 14A to the timer visual 1406 of FIG. 14B, the total allotted time is initiated simultaneously when the query 1402 is displayed and the remaining time to answer the query 1402 is continuously decreasing. According to one embodiment, as depicted in FIG. 14C, displaying the selectable responses 1408 is delayed for a portion of the allotted time. Advantageously, this delay provides the respondent with a portion of the allotted time to read the query 1402 prior to being given with selectable responses 1408. According to various embodiments, an audio output 1404 of the query 1402 may be provided via an electroacoustic transducer during the initial portion of the allotted time prior to displaying the selectable responses 1408. Advantageously, the audio output 1404 may help improve the accuracy of the response provided by the respondent in order to ensure that the respondent understands the query 1402.

According to one embodiment, the selectable responses 1408 may include an option to agree with the query 1402, to pass on answering the question, to replay the query 1402, and/or various other selectable answers. According to various embodiments, the query 1402 may take the form of a statement such that the respondent may "agree" or "disagree" with the statement or may select an answer indicating that the statement is "true" or "false". As defined herein, a "query" may take the form of any request for data or information from a respondent. Various other query formats and/or selectable answers are also contemplated herein (e.g., multiple choice, numeric ranking, short answer, fill-in-the-blank, etc.). The "respondent" may include any person who replies to a query (e.g., employees, students, customers, patrons of an event, voters, patients, etc.).

Figure 15:
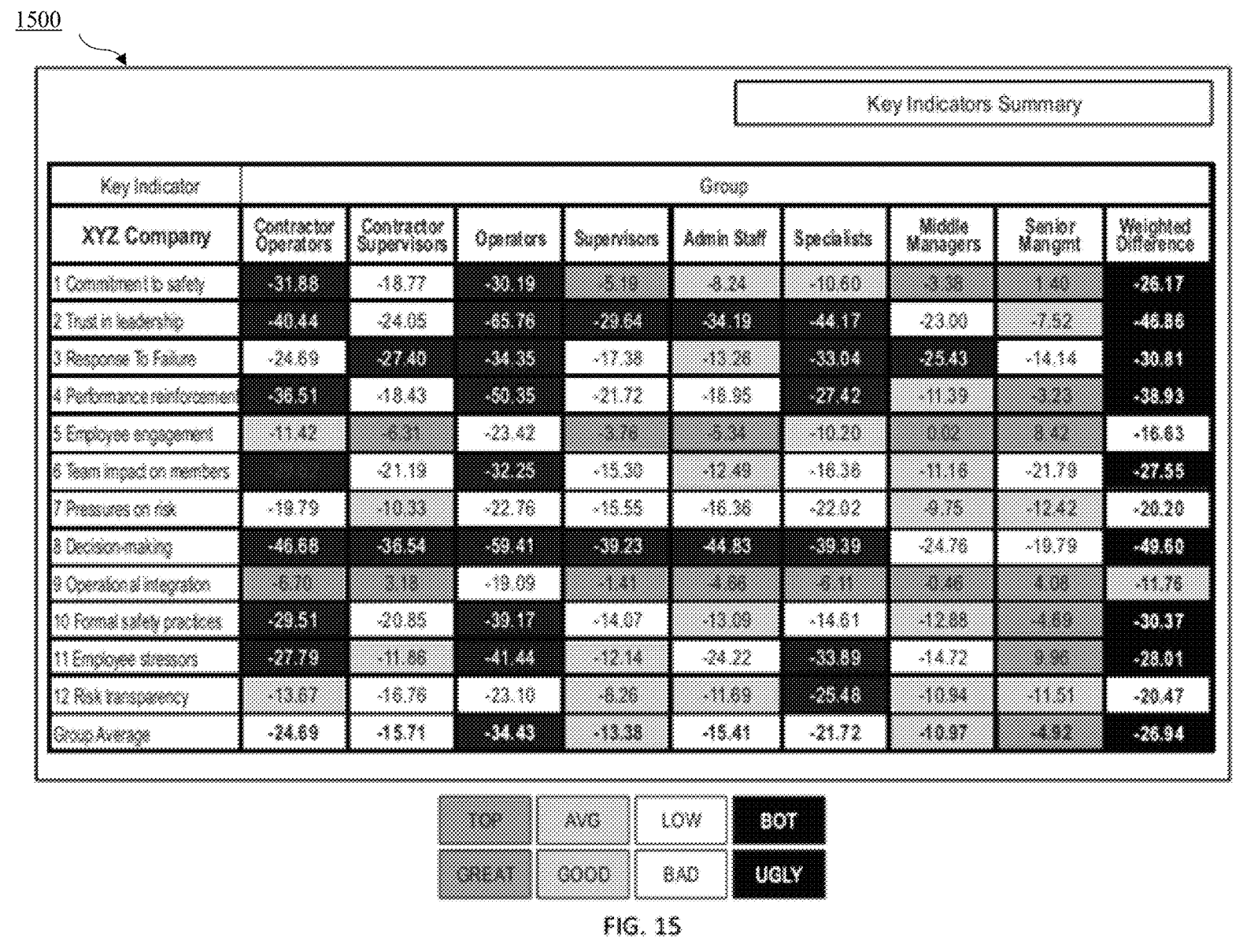

FIG. 15 depicts an example aggregation 1500 of collected response data from multiple respondents to the digital data collection program, in accordance with an embodiment of the present invention. In particular, the aggregation 1500 may include a key indicators summary of responses related to specific indicators in the context of the enterprise. As depicted, the aggregation 1500 may be compartmentalized based on job level (e.g., contractor operators, contractor supervisors, operators, supervisors, administrative staff, specialists, middle managers, senior management, etc.). Various indicators may be assessed depending on the subject or queries of the digital data collection program. As depicted, the various indicators may be related to various risk and/or safety-related indicators of the enterprise including, for example, indicators related to the enterprise's commitment to safety, trust in leadership of the enterprise, the enterprise's response to failure, levels of performance reinforcement, employee engagement, team impact on members, pressures on risk, decision-making at the enterprise, operational integration, formal safety practices, employee stressors, and risk transparency. The aggregation 1500 may also display the weighted difference for each indicator, and may display a group average for each job level.

Figure 16A:
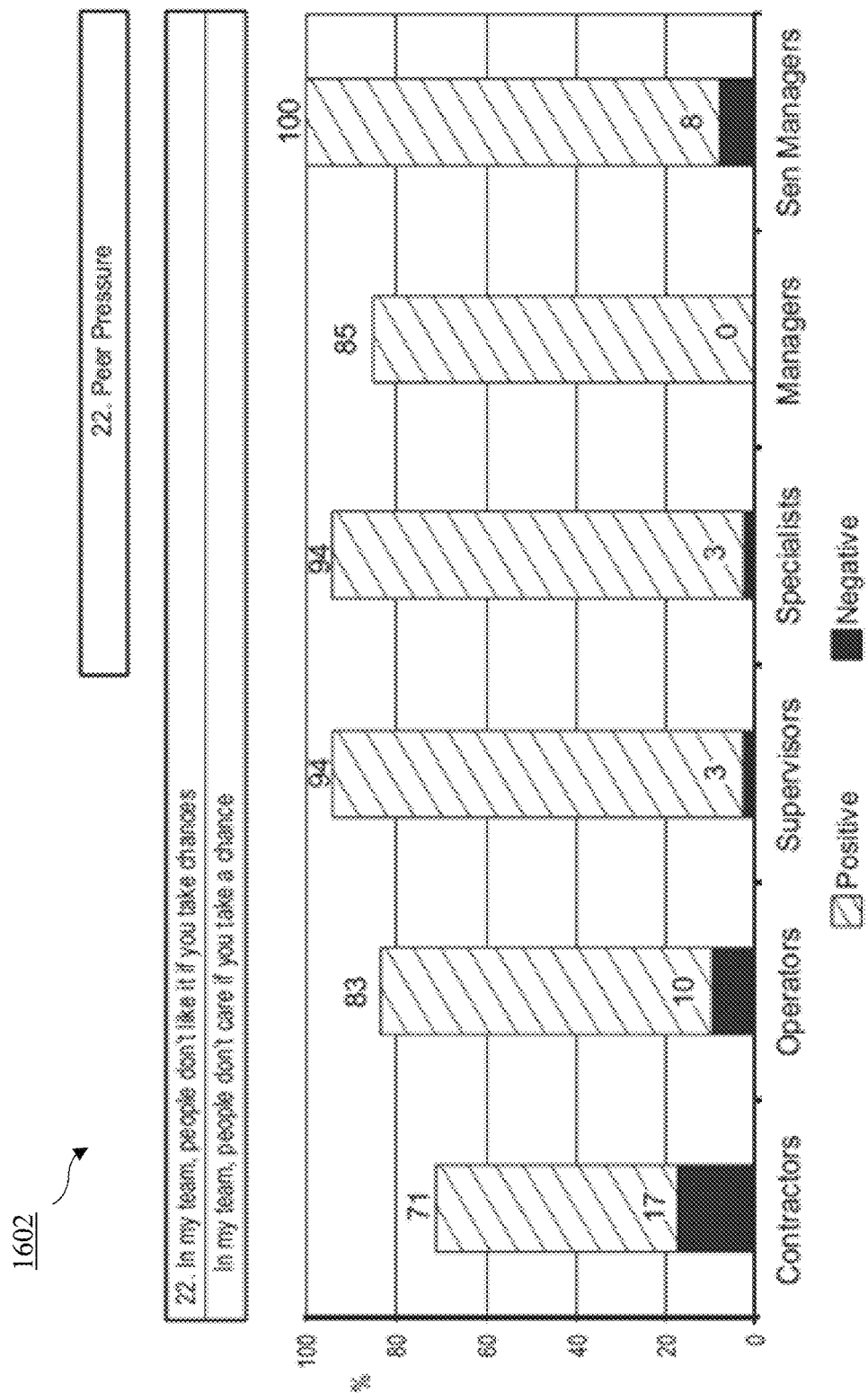
FIG. 16A depicts an example bar graph aggregation of collected response data from multiple respondents to the digital data collection program that work at an enterprise within a specified industry that is received in response to a query, in accordance with an embodiment of the present invention.
Figure 16B:
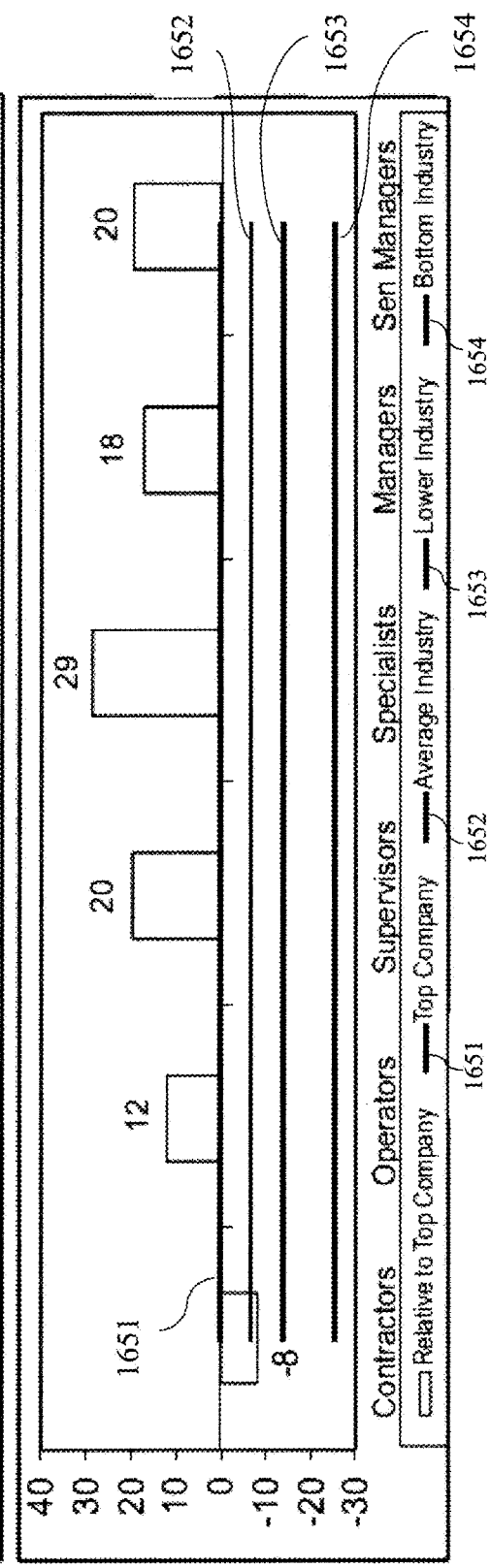
FIG. 16B depicts an example bar graph comparing the aggregated collected response data of FIG. 16A to comparable data of other enterprises of the specified industry, in accordance with an embodiment of the present invention.
Figure 16C:
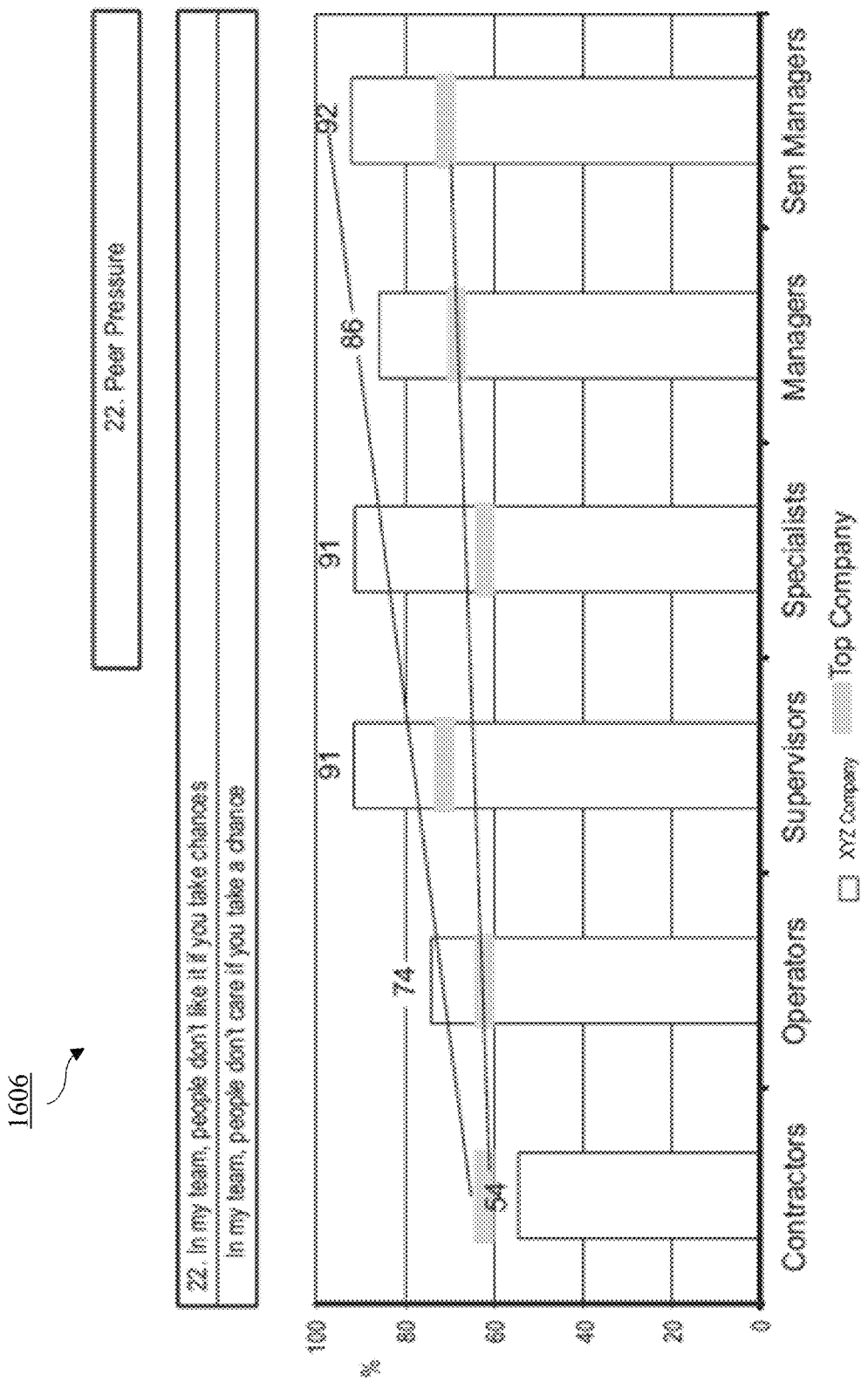
FIG. 16C depicts an example bar graph comparing the aggregated collected response data of FIG. 16A to a top company within the specified industry, in accordance with an embodiment of the present invention.

FIGS. 16A-16C depict example bar graph aggregations 1602, 1604, 1606 of collected response data that is received from multiple respondents in response to a query of the digital data collection program, where the respondents work at an enterprise within a specified industry. In particular, FIG. 16A depicts a bar graph aggregation 1602 of positive and negative responses to a query, where responses are separated based on job level of the respondent. FIG. 16B depicts a bar graph aggregation 1604 comparing responses from respondents of each job level of the enterprise (i.e., XYZ Company) relative to the top faring company in the industry 1651, the average company in the industry 1652, lower faring companies in the industry 1653, and relative to the bottom company in the industry 1654. The bar graph aggregation 1604 takes the difference between the enterprise (i.e., XYZ Company) and the top company in the industry. FIG. 16C depicts a bar graph aggregation 1606 for each job level comparing the enterprise (i.e., XYZ Company) to the top faring company in the industry.

Figure 17A:
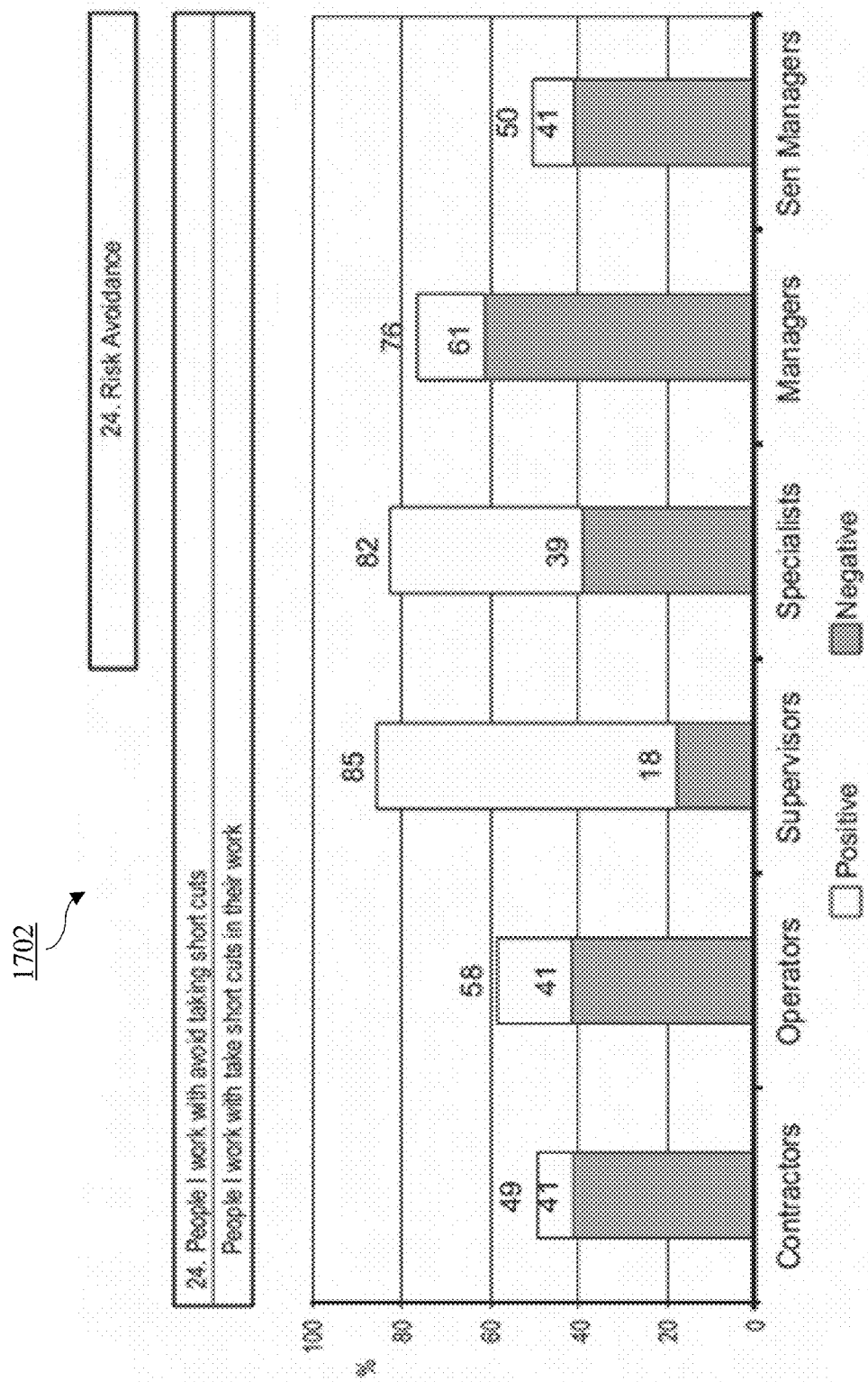
FIG. 17A depicts an example bar graph aggregation of collected response data from multiple respondents to the digital data collection program that work at an enterprise within a specified industry that is received in response to a query, in accordance with an embodiment of the present invention.
Figure 17B:
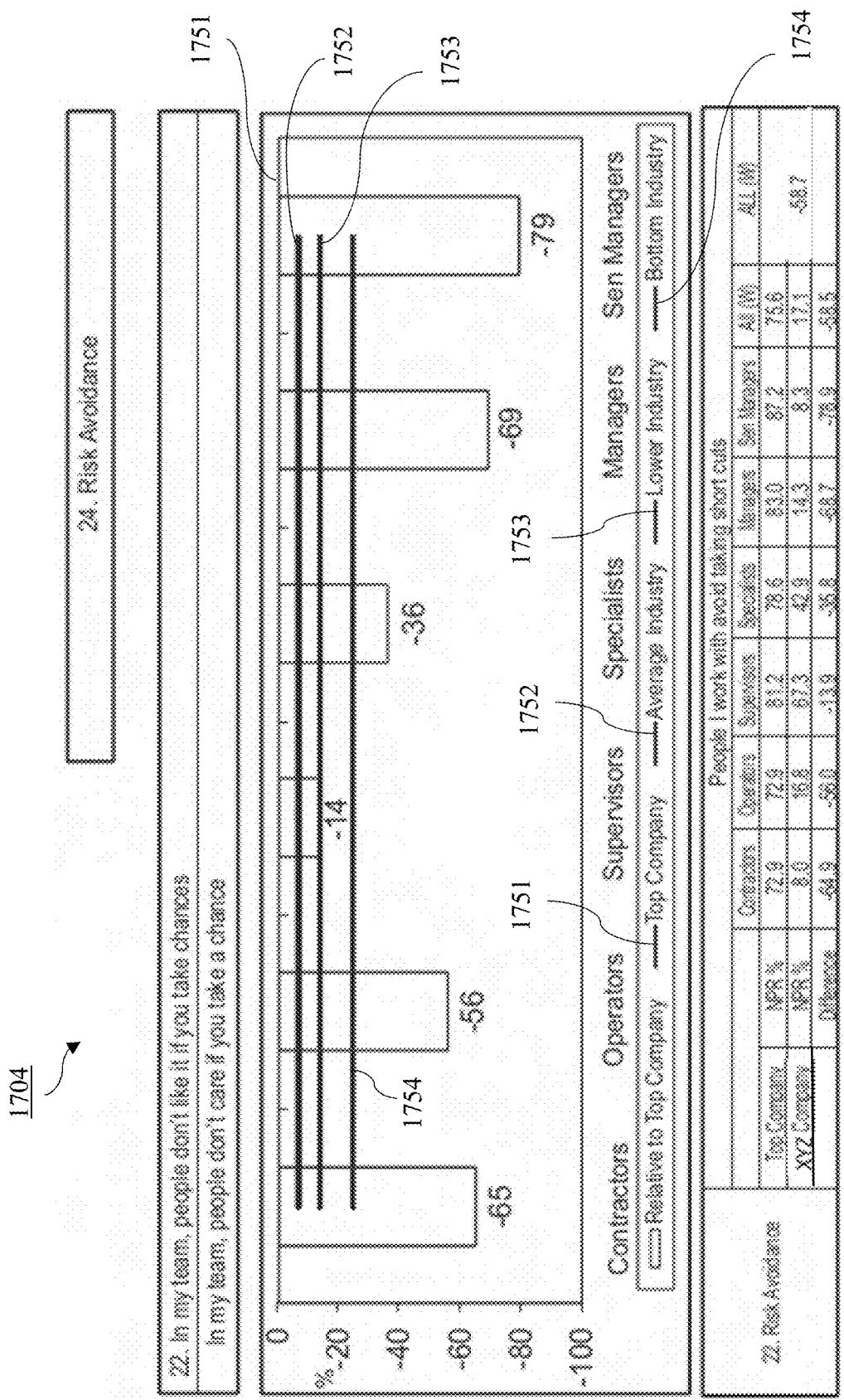
FIG. 17B depicts an example bar graph comparing the aggregated collected response data of FIG. 17A to comparable data of other enterprises of the specified industry, in accordance with an embodiment of the present invention.
Figure 17C:
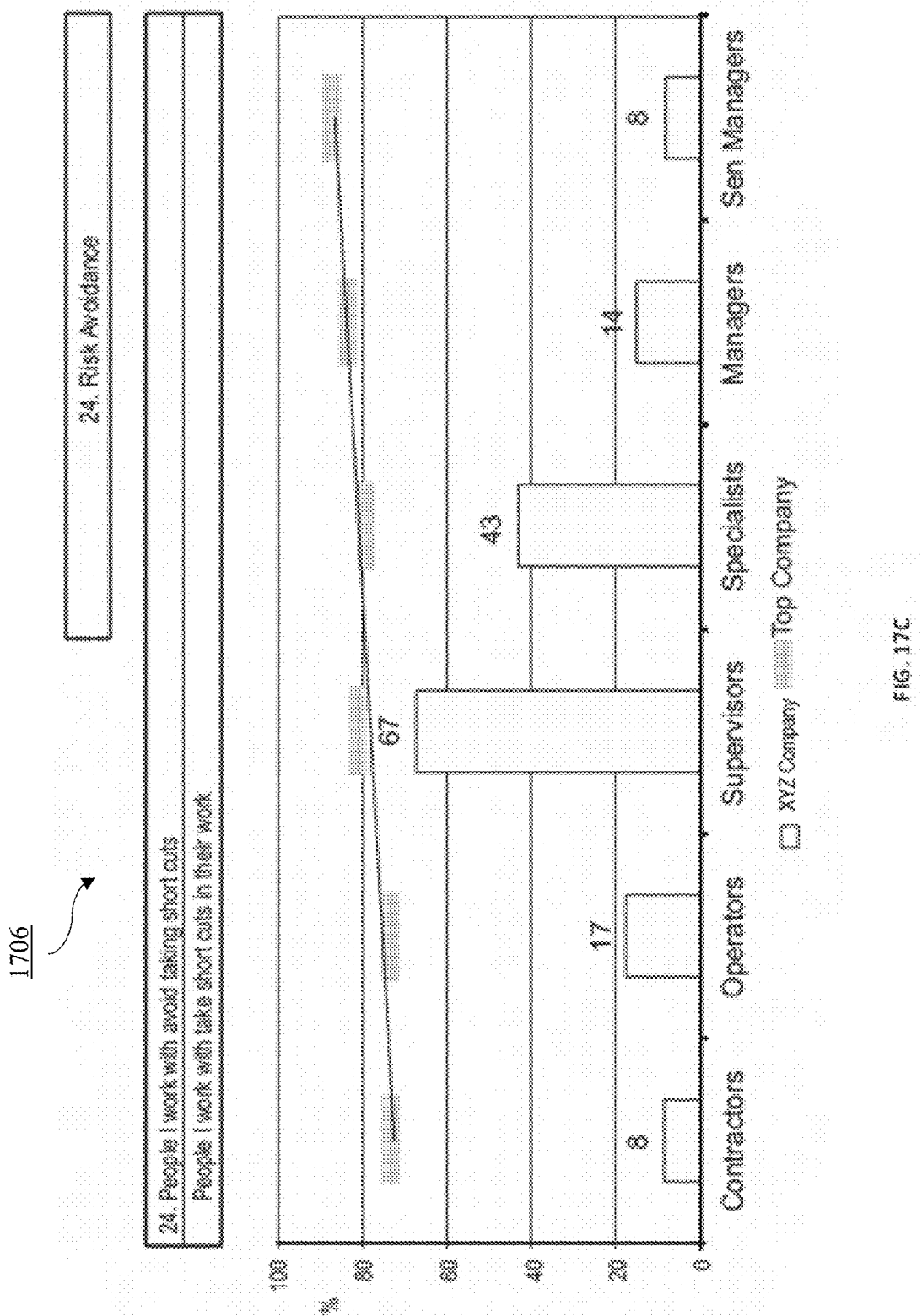
FIG. 17C depicts an example bar graph comparing the aggregated collected response data of FIG. 17A to a top company within the specified industry, in accordance with an embodiment of the present invention.

FIGS. 17A-17C depict example bar graph aggregations 1702, 1704, 1706 of collected response data that is received from multiple respondents in response to a query of the digital data collection program, where the respondents work at an enterprise within a specified industry. In particular, FIG. 17A depicts a bar graph aggregation 1702 of positive and negative responses to a query, where responses are separated based on job level of the respondent. FIG. 17B depicts a bar graph aggregation 1704 comparing responses from respondents of each job level of the enterprise (i.e., XYZ Company) relative to the top faring company in the industry 1751, the average company in the industry 1752, lower faring companies in the industry 1753, and relative to the bottom company in the industry 1754. The bar graph aggregation 1704 takes the difference between the enterprise (i.e., XYZ Company) and the top company in the industry. FIG. 17C depicts a bar graph aggregation 1706 for each job level comparing the enterprise (i.e., XYZ Company) to the top faring company in the industry.

Figure 18:
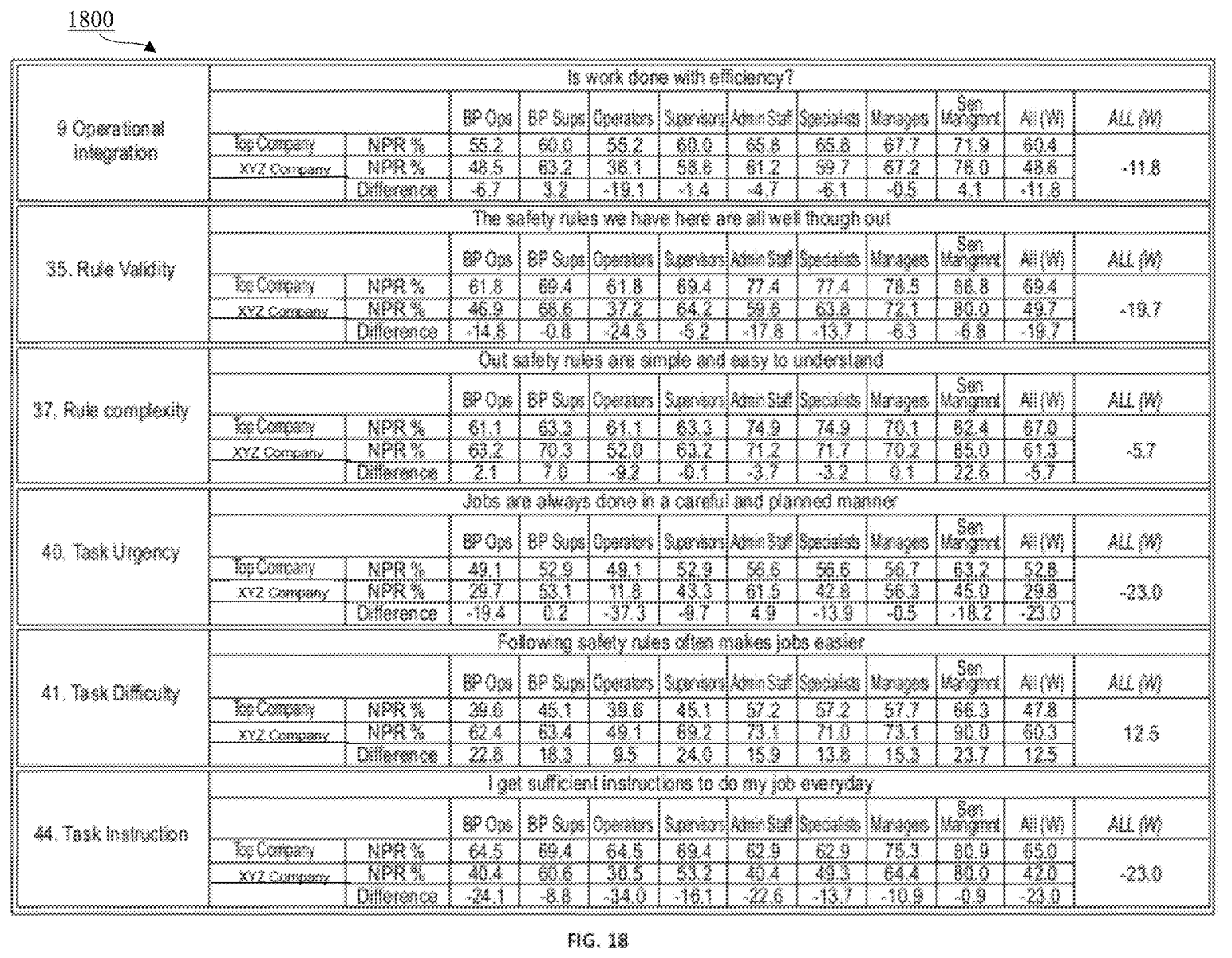

FIG. 18 depicts an example aggregation 1800 of collected response data from multiple respondents to the digital data collection program that work at an enterprise (i.e., XYZ Company) of a specified industry. In particular, the response data from the respondents of the enterprise (i.e., XYZ Company) is compared to response data from a top company in the specified industry. For instance, the responses are categorized based on job level and a difference between the responses of respondents of the enterprise are compared to responses of respondents of the top company for each job level.

Figure 19:
FIG. 19 depicts an example aggregation of collected response data from multiple respondents to the digital data collection program, where the collected response data is related to culture of the enterprise, in accordance with an embodiment of the present invention.

FIG. 19 depicts an example aggregation 1900 of collected response data from multiple respondents to the digital data collection program, where the collected response data is related to culture of the enterprise, in accordance with an embodiment of the present invention. In particular, the response data are categorized based on job level and in accordance to various culture indicators, where each indicator is compared to a benchmark.

Figure 20:
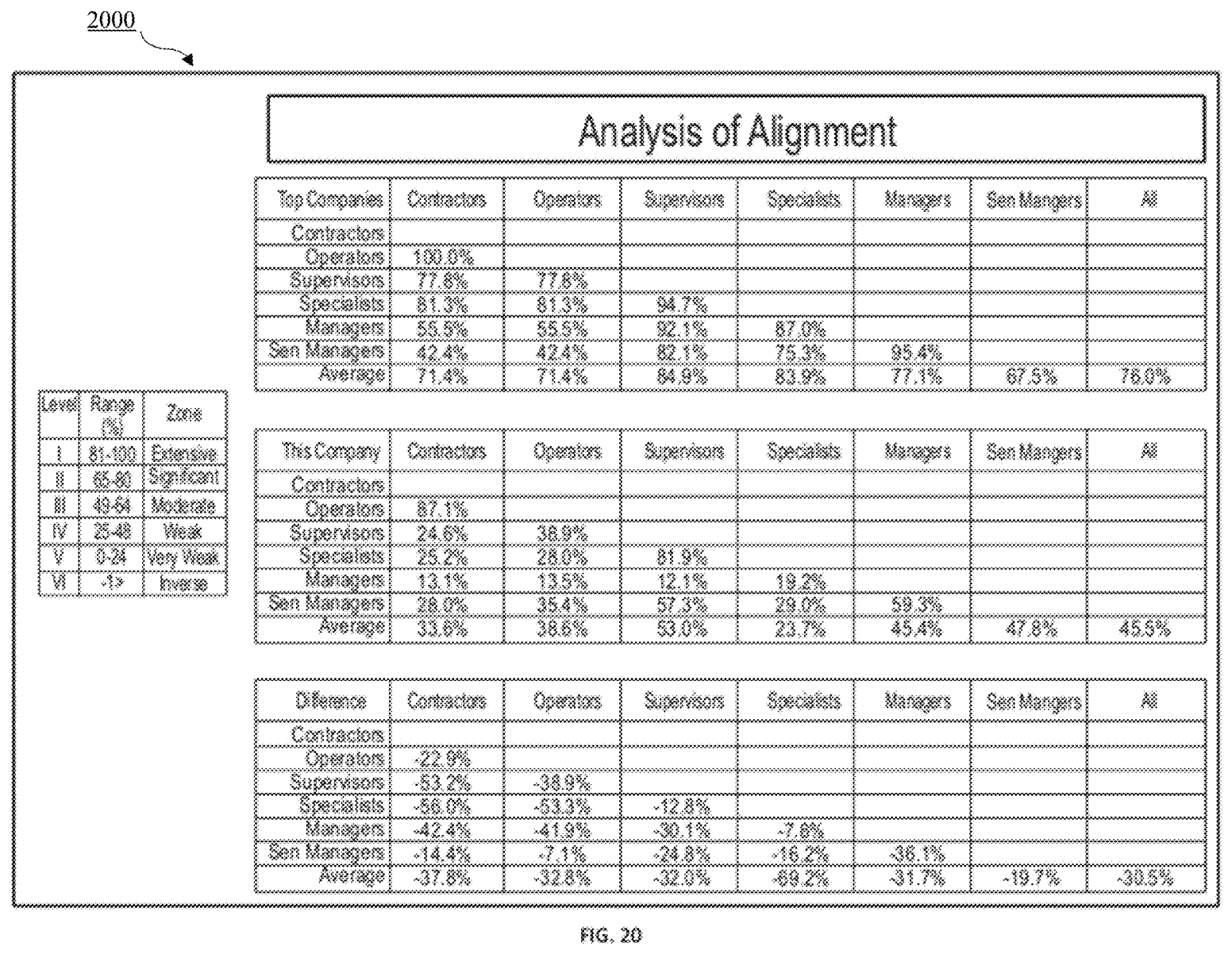

FIG. 20 depicts an example analysis 2000 of alignment of responses between managerial levels of an enterprise within a specified industry compared to top companies within the specified industry, in accordance with an embodiment of the present invention. In particular, responses within different job level categories at the enterprise are compared with responses of similar job level categories at other enterprises within the industry.

FIG. 21 depicts an example analysis 2100 of findings and conclusions derived from responses received as part of the digital data collection program, in accordance with an embodiment of the present invention. In particular, the findings and conclusions may inform the enterprise within a particular industry of comparative performance relative the industry benchmark.

Figure 22:
FIG. 22 depicts example recommendations based on analysis of responses received as part of the digital data collection program, in accordance with an embodiment of the present invention.

FIG. 22 depicts example recommendations 2200 based on analysis of responses received as part of the digital data collection program, in accordance with an embodiment of the present invention. In particular, the tactical recommendations 2200 may indicate ways in which the enterprise may enhance its performance in certain areas.

Figure 23:
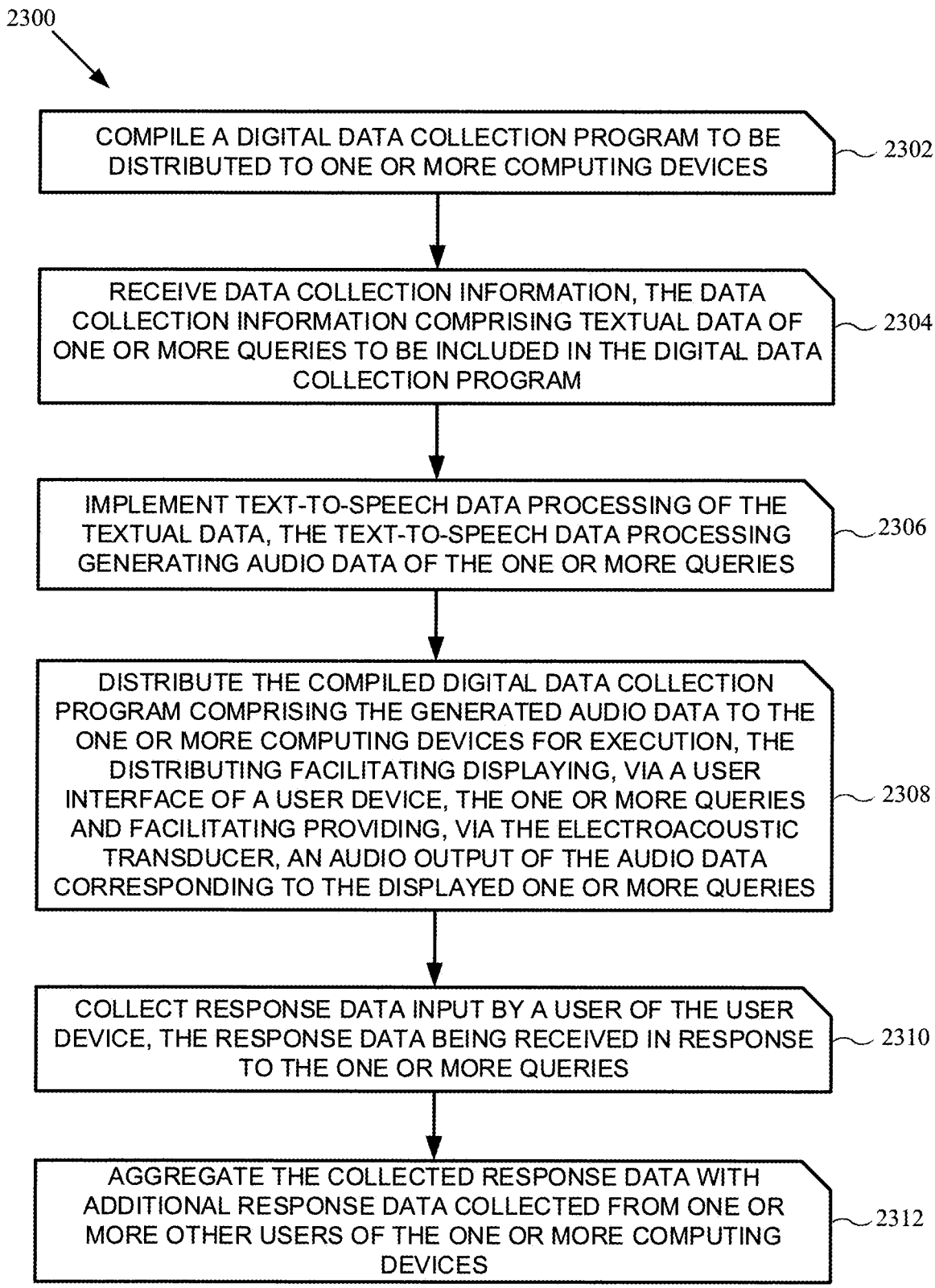
FIG. 23 depicts a block diagram of an example method for text-to-speech audio processing and audio transduction, in accordance with an embodiment of the present invention.

FIG. 23 depicts a block diagram of an example method 2300 for text-to-speech audio processing and audio transduction, in accordance with an embodiment of the present invention. At block 2302, the method includes compiling a digital data collection program (e.g., a digital survey) to be distributed to one or more computing devices (e.g., an instructor/proctor device, mobile devices, etc.). The digital data collection program is compiled based in part on receiving, at block 2304, data collection information that includes textual data of one or more queries that are to be included in the digital data collection program. The textual data may include queries input, for example, by a system administrator or may include queries automatically generated based on various AI and/or machine learning models. For instance, according to various embodiments, the compiling further includes generating, using AI and/or machine learning models, the digital data collection program based on one or more enterprise parameters. Such parameters may be associated with the objective to be tested such as, for example, workplace safety.

At block 2306, text-to-speech processing of the textual data is implemented, where the text-to-speech data processing, in part, generates audio data of the one or more queries. According to various embodiments, the compiling further includes uploading the digital data collection program to a storage location (e.g., a database, cloud storage, etc.).

At block 2308, the compiled digital data collection program that includes, in part, the generated audio data is distributed to one or more computing devices for execution, where the distributing facilitates displaying, via a user interface of a user device, the one or more queries and also facilitates providing, via the electroacoustic transducer, an audio output of the audio data that corresponds to the displayed one or more queries. According to various embodiments, the distributing is further based on accessing the uploaded digital data collection program from a storage location. Further, according to various embodiments, the distributing includes displaying a scannable code (e.g., a quick response (QR) code, bar code, etc.) associated with the compiled digital data collection program on a display of the one or more computing devices, where displaying the one or more queries is based on the user using the user device to scan the scannable code. According to various embodiments, the distributing further facilitates displaying at least two selectable responses to each of the one or more queries.

Additionally, the distributing may further facilitate displaying a timer visual indicating remaining time from a total allotted time provided to the user to select a selectable response of the at least two selectable responses displayed for each of the one or more queries. Further, the total allotted time may be initiated simultaneously with displaying a query of the one or more queries as well as displaying the timer visual such that each query is associated with a total allotted response time. Additionally, according to various embodiments, displaying the at least two selectable responses is delayed for a portion of the total allotted time provided to respond to the query. For instance, the total allotted time provided to the user to respond to the query may be, for example, within a range of about 2 seconds to about 20 seconds, or more particularly within a range of about 5 seconds to about 15 seconds, or more particularly approximately 10 seconds. Further, the portion of allotted time in which the at least two selectable responses are displayed may only be a portion less than the full total allotted time provided to the user. For instance, the portion of allotted time may be, for example, within a range of about 1 second to about 10 seconds, or more particularly within a range of about 3 seconds to about 8 seconds, or more particularly approximately 5 seconds. For example, the portion of allotted time in which the at least two selectable responses are displayed may be approximately half of the total allotted response time.

According to various embodiments, the one or more queries may include a classification query for the user to select an enterprise-related classification to which the user most closely corresponds. For instance, the enterprise-related classification may include, for example, a work site, a job level, a department, etc. Additionally or alternatively, the one or more queries may include questions related to workplace conditions at an enterprise. For instance, the queries may include questions related to workplace safety, workplace culture, workplace leadership, etc.

At block 2310, response data input by a user of the user device is collected, where the response data is received in response to the one or more queries. Further, at block 2312, the collected response data is aggregated with additional response data collected from one or more other users of the one or more computing devices. For instance, the aggregated collected response data of an enterprise within a specified industry may be compared to comparable data of other enterprises of the specified industry. Additionally, based thereon an analysis of the aggregated collected response data relative the comparable data of the other enterprises may be provided. Such analysis may be provided, according to various embodiments, to computing device(s) of administrative users or those assigned to distribute or conduct the digital data collection program. According to various embodiments, comparing the aggregated collected response data may include comparing classification-specific response data of users that selected an enterprise related classification in response to being provided with a query of the one or more queries to comparable data that includes classification-specific comparable data of the other enterprises. For instance, responses received from respondents of a particular job level of an enterprise may be compared to responses received from respondents of a similar job level at other enterprises.

According to various embodiments, the processes at blocks 2308, 2310, and/or 2312 may be repeated at periodic intervals to different subsets of users of the one or more computing devices. For instance, each year, quarter, month, or other period of time the digital data collection program, or portions (e.g., questions) thereof may be redistributed to various subsets of users. Further, such periodic distribution may be repeated in order to retrieve responses so that changes to the responses can be monitored over time. For example, according to various embodiments, the aggregated collected response data for a periodic interval may be analyzed relative response data from previous periodic intervals. Further, the analyzing may incorporate applying an algorithm to derive a coefficient related to risk exposure of the enterprise and a report may be generated that indicates changes to the risk exposure of the enterprise over time.

Figure 24:
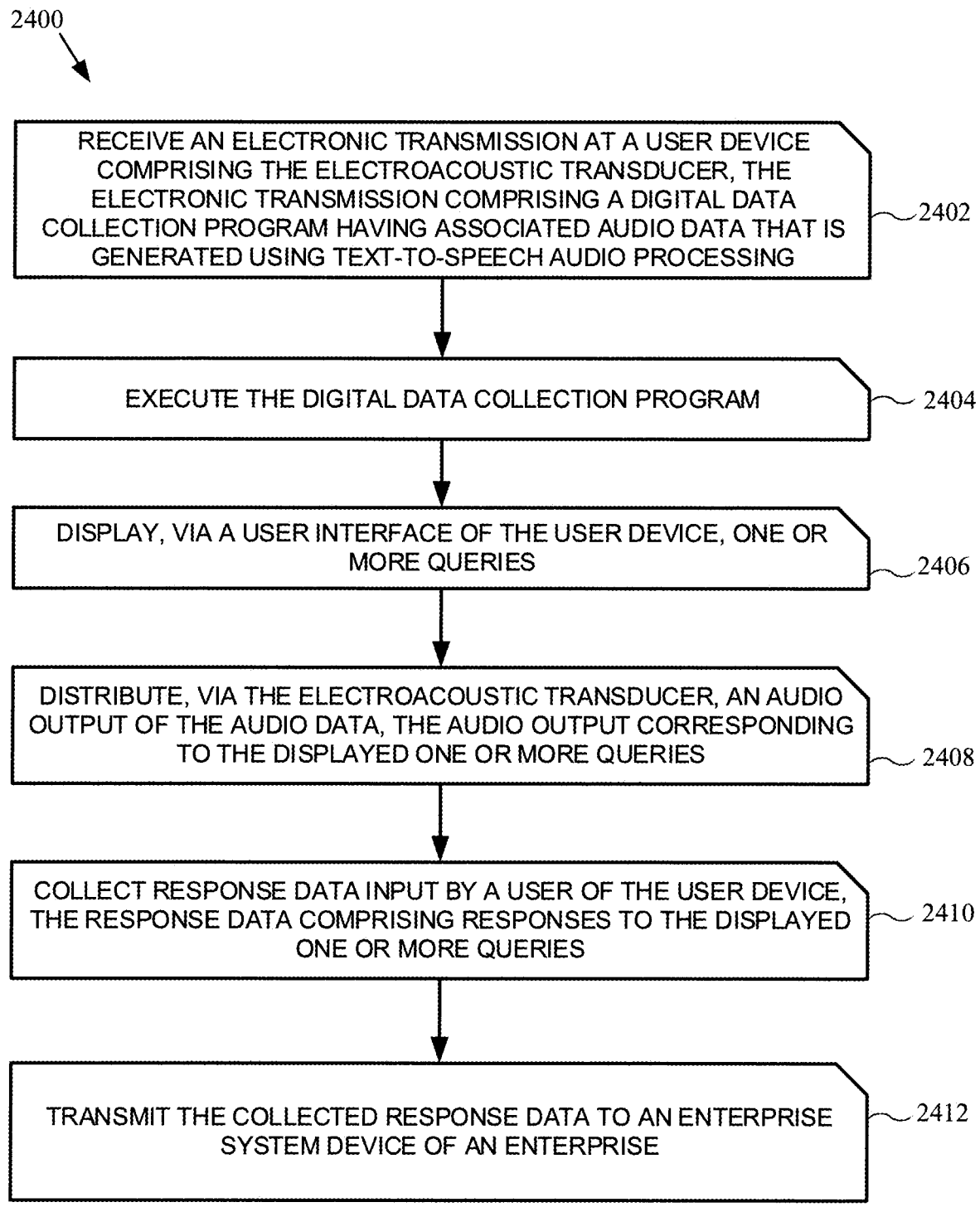
FIG. 24 depicts a block diagram of an example method for text-to-speech audio processing and audio transduction, in accordance with an embodiment of the present invention.

FIG. 24 depicts a block diagram of an example method 2400 for text-to-speech audio processing and audio transduction, in accordance with an embodiment of the present invention. At block 2402, an electronic transmission is received at a user device that includes an electroacoustic transducer, where the electronic transmission includes a digital data collection program (e.g., a digital survey) having associated audio data that is generated using text-to-speech audio processing. At block 2404, the digital data collection program is executed. Further, the executing includes displaying, at block 2406 and via a user interface of the user device, one or more queries. According to various embodiments, the one or more queries may include questions related to workplace conditions at the enterprise. For instance, the queries may include questions related to workplace safety, workplace culture, workplace leadership, etc. Additionally, according to various embodiments, the displaying may further include displaying at least two selectable responses to each of the one or more queries. According to various embodiments, the displaying may also or alternatively include a timer visual indicating remaining time from a total allotted time that is permitted for the user to select a selectable response for each of the one or more queries, where the selectable response is selected from at least two selected responses associated with each query. Further, the total allotted time may be initiated, according to various embodiments, simultaneously with displaying a query and displaying the timer visual. According to various embodiments, the at least two selectable responses may be delayed such that they are displayed for only a portion of the total allotted time.

For instance, the total allotted time provided to the user to respond to the query may be, for example, within a range of about 2 seconds to about 20 seconds, or more particularly within a range of about 5 seconds to about 15 seconds, or more particularly approximately 10 seconds. Further, the portion of allotted time in which the at least two selectable responses are displayed may only be a portion less than the full total allotted time provided to the user. For instance, the portion of allotted time may be, for example, within a range of about 1 second to about 10 seconds, or more particularly within a range of about 3 seconds to about 8 seconds, or more particularly approximately 5 seconds. For example, the portion of allotted time in which the at least two selectable responses are displayed may be approximately half of the total allotted response time.

At block 2408, an audio output of the audio data is distributed via the electroacoustic transducer, where the audio output corresponds to the displayed one or more queries. At block 2410, response data input by a user of the user device is collected, where the response data includes a response to each of the displayed one or more queries. Further, at block 2412, the collected response data is transmitted to an enterprise system device of an enterprise.

Aspects of the present invention are described herein with reference to flowchart illustrations and/or block diagrams of computer-implemented methods and computing systems according to embodiments of the invention. It will be understood that each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus (the term "apparatus" includes systems and computer program products). The processor(s) may execute the computer readable program instructions thereby creating a means for implementing the actions specified in the flowchart illustrations and/or block diagrams.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the actions specified in the flowchart illustrations and/or block diagrams. In particular, the computer readable program instructions may be used to produce a computer-implemented method by executing the instructions to implement the actions specified in the flowchart illustrations and/or block diagrams.

The computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable instructions for implementing the specified logical function(s). Additionally, the alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, or the functions of the blocks may sometimes be executed in the reverse order, depending upon the functionality involved.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®", "Windows®", "macOS®", "iOS®", "Android®", and the like may be subject to trademark rights in various jurisdictions throughout the world and are used here only in reference to the products or services properly denominated by the marks to the extent that such trademark rights may exist.

What is claimed is:

1. A computing system for text-to-speech audio processing and audio distribution via an electroacoustic transducer, the computing system comprising:
    one or more processors; and
    at least one computer readable storage medium storing program instructions executable by the one or more processors to:
        compile a digital data collection program to be distributed to one or more computing devices, the compiling including:
            receiving data collection information, the data collection information comprising textual data of one or more queries to be included in the digital data collection program;
            training a text-to-speech module to perform text-to-speech data processing, the training comprising modeling a relationship between textual inputs and acoustic realizations by, in part, inserting training data comprising a target variable value into an iterative training loop and updating weights and calculations for one or more iterations of the iterative training loop to improve predictability of the target variable value; and
            deploying the trained text-to-speech module and implementing text-to-speech data processing of the textual data using the trained text-to-speech module, the text-to-speech data processing generating audio data of the one or more queries;
        distribute the compiled digital data collection program comprising the generated audio data to the one or more computing devices for execution, the distributing facilitating displaying, via a user interface of a user device, the one or more queries and facilitating providing, via the electroacoustic transducer, an audio output of the audio data corresponding to the displayed one or more queries;
        collect response data input by a user of the user device, the response data being received in response to the one or more queries; and
        aggregate the collected response data with additional response data collected from one or more other users of the one or more computing devices.

2. The computer system for text-to-speech audio processing and audio distribution via the electroacoustic transducer of claim 1, wherein the compiling further includes generating the digital data collection program based on one or more enterprise parameters.

3. The computer system for text-to-speech audio processing and audio distribution via the electroacoustic transducer of claim 1, wherein the compiling further includes uploading the digital data collection program to a storage location and the distributing is based on accessing the uploaded digital data collection program from the storage location.

4. The computer system for text-to-speech audio processing and audio distribution via the electroacoustic transducer of claim 1, wherein the digital data collection program comprises a digital survey.

5. The computing system for text-to-speech audio processing and audio distribution via the electroacoustic transducer of claim 1, wherein the distributing includes displaying a scannable code associated with the compiled digital data collection program on a display of the one or more computing devices, and wherein the displaying the one or more queries is based on the user using the user device to scan the scannable code.

6. The computing system for text-to-speech audio processing and audio distribution via the electroacoustic transducer of claim 1, wherein the one or more queries comprise a plurality of queries, with each query of the plurality of queries being displayed sequentially, and the distributing further facilitates displaying (i) at least two selectable responses to each query of the plurality of queries, (ii) a timer visual indicating remaining time from a total allotted time to answer a single query of the plurality of queries by selecting a selectable response of the at least two selectable responses, the timer being applicable solely for the single query of the plurality of queries.

7. The computing system for text-to-speech audio processing and audio distribution via the electroacoustic transducer of claim 6, wherein the total allotted time is initiated simultaneously with displaying the single query and displaying the timer visual, and wherein displaying the at least two selectable responses is delayed for a portion of the total allotted time to provide a respondent with the portion of the total allotted time to read the given query prior to displaying the at least two selectable responses.

8. The computing system for text-to-speech audio processing and audio distribution via the electroacoustic transducer of claim 7, wherein the total allotted time is within a range of 2 seconds to 20 seconds and wherein the portion of the total allotted time is within a range of 1 second to 10 seconds.

9. The computing system for text-to-speech audio processing and audio distribution via the electroacoustic transducer of claim 1, wherein the one or more queries include a classification query for the user to select an enterprise-related classification to which the user most closely corresponds.

10. The computing system for text-to-speech audio processing and audio distribution via the electroacoustic transducer of claim 1, wherein the program instructions executable by the one or more processors further compares the aggregated collected response data of an enterprise within a specified industry to comparable data of other enterprises of the specified industry, and based thereon providing an analysis of the aggregated collected response data relative the comparable data of the other enterprises.

11. The computing system for text-to-speech audio processing and audio distribution via the electroacoustic transducer of claim 10, wherein the comparing the aggregated collected response data includes comparing classification-specific response data of users that selected an enterprise related classification in response to a query of the one or more queries to the comparable data where the comparable data includes classification-specific comparable data of the other enterprises.

12. The computing system for text-to-speech audio processing and audio distribution via the electroacoustic transducer of claim 1, wherein the one or more queries include questions related to workplace safety conditions at an enterprise.

13. The computing system for text-to-speech audio processing and audio distribution via the electroacoustic transducer of claim 1, wherein the distributing, collecting, and aggregating are repeated on a periodic interval to differing subsets of users of the one or more computing devices.

14. The computing system for text-to-speech audio processing and audio distribution via the electroacoustic transducer of claim 13, the program instructions executable by the one or more processors further:
   analyze the aggregated collected response data for the periodic interval relative previous periodic intervals; and
   generate a report indicating changes to risk exposure of the enterprise over time.

15. A computing system for text-to-speech audio processing and audio distribution via an electroacoustic transducer, the computing system comprising:
   one or more processors; and
   at least one computer readable storage medium storing program instructions executable by the one or more processors to:
   receive an electronic transmission at a user device comprising the electroacoustic transducer, the electronic transmission comprising a digital data collection program having associated audio data that is generated using text-to-speech audio processing wherein the text-to-speech audio processing utilizes a trained text-to-speech module that is trained to perform text-to-speech data processing, the training comprising modeling a relationship between textual inputs and acoustic realizations by, in part, inserting training data comprising a target variable value into an iterative training loop and updating weights and calculations for one or more iterations of the iterative training loop to improve predictability of the target variable value;
   execute the digital data collection program, the executing including:
      displaying, via a user interface of the user device, one or more queries; and
      distributing, via the electroacoustic transducer, an audio output of the audio data, the audio output corresponding to the displayed one or more queries;
   collect response data input by a user of the user device, the response data comprising a response to each of the displayed one or more queries; and
   transmit the collected response data to an enterprise system device of an enterprise.

16. The computing system for text-to-speech audio processing and audio distribution via the electroacoustic transducer of claim 15, wherein the digital data collection program comprises a digital survey and the one or more queries include at least one question related to workplace safety conditions at the enterprise.

17. The computing system for text-to-speech audio processing and audio distribution via the electroacoustic transducer of claim 15, wherein the one or more queries comprise a plurality of queries, with each query of the plurality of queries being displayed sequentially, and the displaying further includes displaying (i) at least two selectable responses to each query of the plurality of queries, (ii) a timer visual indicating remaining time from a total allotted time to answer a single query of the plurality of queries by selecting a selectable response of the at least two selectable responses, the time being applicable solely for the single query of the plurality of queries.

18. A computer-implemented method for text-to-speech audio processing and audio distribution via an electroacoustic transducer, the computer-implemented method comprising:
- compiling a digital data collection program to be distributed to one or more computing devices, the compiling including:
  - receiving data collection information, the data collection information comprising textual data of one or more queries to be included in the digital data collection program;
  - training a text-to-speech module to perform text-to-speech data processing, the training comprising modeling a relationship between textual inputs and acoustic realizations by, in part, inserting training data comprising a target variable value into an iterative training loop and updating weights and calculations for one or more iterations of the iterative training loop to improve predictability of the target variable value; and
  - deploying the trained text-to-speech module and implementing text-to-speech data processing of the textual data using the trained text-to-speech module, the text-to-speech data processing generating audio data of the one or more queries;
- distributing the compiled digital data collection program comprising the generated audio data to the one or more computing devices for execution, the distributing facilitating displaying, via a user interface of a user device, the one or more queries and facilitating providing, via the electroacoustic transducer, an audio output of the audio data corresponding to the displayed one or more queries;
- collecting response data input by a user of the user device, the response data being received in response to the one or more queries; and
- aggregating the collected response data with additional response data collected from one or more other users of the one or more computing devices.

19. The computer-implemented method for text-to-speech audio processing and audio distribution via the electroacoustic transducer of claim 18, wherein the distributing, collecting, and aggregating are repeated on a periodic interval to differing subsets of users of the one or more computing devices.

20. The computer-implemented method for text-to-speech audio processing and audio distribution via the electroacoustic transducer of claim 19, further including:
- analyzing the aggregated collected response data for the periodic interval relative previous periodic intervals; and
- generating a report indicating changes to risk exposure of the enterprise over time.

\* \* \* \* \*